US012289678B2

(12) United States Patent
Xu et al.

(10) Patent No.: US 12,289,678 B2
(45) Date of Patent: Apr. 29, 2025

(54) SCG STATE CONTROL METHOD AND APPARATUS, UE, MN, SN AND MEDIUM

(71) Applicant: DATANG MOBILE COMMUNICATIONS EQUIPMENT CO., LTD., Beijing (CN)

(72) Inventors: Meng Xu, Beijing (CN); Jing Liang, Beijing (CN)

(73) Assignee: Datang Mobile Communications Equipment Co., Ltd., Beijing (CN)

(*) Notice: Subject to any disclaimer, the term of this patent is extended or adjusted under 35 U.S.C. 154(b) by 799 days.

(21) Appl. No.: 17/427,740

(22) PCT Filed: Jan. 14, 2020

(86) PCT No.: PCT/CN2020/072092
§ 371 (c)(1),
(2) Date: Aug. 2, 2021

(87) PCT Pub. No.: WO2020/156156
PCT Pub. Date: Aug. 6, 2020

(65) Prior Publication Data
US 2022/0116874 A1 Apr. 14, 2022

(30) Foreign Application Priority Data
Feb. 2, 2019 (CN) .......................... 201910106573.5

(51) Int. Cl.
*H04W 52/02* (2009.01)
*H04W 28/02* (2009.01)
(Continued)

(52) U.S. Cl.
CPC ... *H04W 52/0229* (2013.01); *H04W 28/0278* (2013.01); *H04W 52/0235* (2013.01);
(Continued)

(58) Field of Classification Search
CPC ............. H04W 76/20; H04W 52/0229; H04W 72/542; H04W 72/23
(Continued)

(56) References Cited

U.S. PATENT DOCUMENTS 11,895,582 B2 * 2/2024 Zhou ..................... H04L 5/0032
2015/0208269 A1 7/2015 Damnjanovic et al.
(Continued)

FOREIGN PATENT DOCUMENTS

CA 3057416 A1 9/2018
CN 104469830 A 3/2015
(Continued)

OTHER PUBLICATIONS

Ericcson, Introduction of L2 Latency reductions in LTE, 3GPP TSG-RAN2 Meeting 94, R2-163838, Nanjing, China, May 23-27, 2016).
(Continued)

Primary Examiner — Chuck Huynh
(74) Attorney, Agent, or Firm — Meunier Carlin & Curfman LLC

(57) ABSTRACT

Disclosed are an SCG state control method and apparatus, a UE, an MN, an SN, and a medium. The method comprises: a UE determining whether there is data transmission at an SCG; when it is determined that there is no data transmission at the SCG, controlling a PSCell in the SCG to enter a sleep state; and when it is determined that there is data transmission at the SCG, controlling the PSCell in the SCG to enter an activated state. In the embodiments of the present application, when it is determined that there is no data transmission at an SCG, a UE controls a PSCell in the SCG to enter a sleep state, thereby avoiding wasteful power consumption; moreover, there is no need to release the SCG, such that there is also no need to configure the SCG again when data
(Continued)

transmission is initiated at an SCG side again, and data transmission is scheduled at the SCG in a timely manner according to a CSI measurement result reported when the PSCell is in the sleep state, thereby reducing the data transmission delay. Provided is a solution for fast recovery of data transmission under energy saving conditions.

8 Claims, 4 Drawing Sheets

(51) Int. Cl.
  *H04W 72/23* (2023.01)
  *H04W 72/542* (2023.01)
  *H04W 76/20* (2018.01)
  *H04W 80/02* (2009.01)
(52) U.S. Cl.
  CPC ......... *H04W 72/23* (2023.01); *H04W 72/542* (2023.01); *H04W 76/20* (2018.02); *H04W 80/02* (2013.01)
(58) Field of Classification Search
  USPC .......................................... 370/318
  See application file for complete search history.

(56) References Cited

U.S. PATENT DOCUMENTS

| | | |
|---|---|---|
| 2015/0215929 A1 | 7/2015 | Damnjanovic et al. |
| 2016/0044744 A1 | 2/2016 | Lee et al. |
| 2017/0013671 A1 | 1/2017 | Xu et al. |
| 2017/0170941 A1 | 6/2017 | Yang et al. |
| 2017/0170942 A1 | 6/2017 | Qiu et al. |
| 2017/0208643 A1 | 7/2017 | Kim et al. |
| 2018/0006773 A1 | 1/2018 | Kim et al. |
| 2018/0124864 A1 | 5/2018 | Lee et al. |
| 2018/0278383 A1 | 9/2018 | Kim et al. |

FOREIGN PATENT DOCUMENTS

| | | |
|---|---|---|
| CN | 104796930 A | 7/2015 |
| CN | 104811929 A | 7/2015 |
| CN | 104811962 A | 7/2015 |
| CN | 105451364 A | 3/2016 |
| CN | 105940651 A | 9/2016 |
| CN | 106538034 A | 3/2017 |
| WO | 2016180463 A1 | 11/2016 |

OTHER PUBLICATIONS

Email discussion on interruptions in DC, 3GPP TSG-RAN WG4 Meeting #73, R4-147183, Huawei, Nov. 21, 2014, 9 pages.

International Search Report issued in PCT/CN2020/072092, mailed Mar. 18, 2020, 4 pages.

\* cited by examiner

Pcell: Primary Cell    PSCell: Primary SCG Cell    SCell: Secondary Cell

SCG STATE CONTROL METHOD AND APPARATUS, UE, MN, SN AND MEDIUM

The present application is a National Stage of International Application No. PCT/CN2020/072092, filed on Jan. 14, 2020, which claims priority from Chinese Patent Application No. 201910106573.5, filed with the Chinese Patent Office on Feb. 2, 2019 and entitled "SCG State Control Method and Apparatus, UE, MN, SN and Medium", both of which are hereby incorporated by reference in their entireties.

FIELD OF INVENTION

The present application relates to the field of communication technologies, and particularly to an SCG state control method and apparatus, UE, MN, SN and medium.

BACKGROUND

With the continuous development of communication technology, the people have put forward higher requirements for the transmission rate. In order to increase the transmission rate, a network architecture that can realize the cooperation/aggregation among multiple evolved NodeBs (eNBs) is proposed. In this architecture, a part of Radio Bearers (RBs) of a User Equipment (UE) is on a Master Cell Group (MCG) managed by a Master Node (MN), and this part of RBs include Signaling Radio Bearers (SRBs) and Data Radio Bearers (DRBs). The other part of bearers of the same UE is on a Secondary Cell Group (SCG) managed by a Secondary Node (SN). Since the same UE is connected to two eNBs at the same time under this architecture, it is called Dual Connectivity (DC). In addition, the dual connectivity architecture is no longer limited to the dual connectivity of eNBs with the evolution of communication technology. This architecture has been expanded to: the MN node may be an eNB or a 5G base station gNB, and the SN node may be an eNB or a gNB.

The Carrier Aggregation (CA)/DC enhancement project is introduced in the second phase standard (R16) of the 5G. The network side can configure an SCG for the UE to perform load sharing, to improve the transmission rate of the UE. However, in the prior art, after the network side configures the SCG for the UE, the Primary SCG Cell (PSCell) will always be in the activated state even if the data transmission on the SCG side has ended, which may cause the waste of power consumption for the case when the interruption delay for the service type data transmission is relatively large; but if the network side informs the UE to release the SCG after the data transmission is interrupted, the network side needs to reconfigure the SCG for the UE when the data transmission is initiated again, which causes a large data transmission delay and increases the signaling consumption. How to quickly resume the data transmission while saving energy has become an urgent problem to be solved.

BRIEF SUMMARY

The present application provides a SCG state control method and apparatus, UE, MN, SN and medium, so as to save the power consumption and reduce the data transmission delay.

In a first aspect, the present application discloses an SCG state control method, which includes:

determining, by a UE, whether there is data transmission on an SCG;
controlling a PSCell to enter a dormant state when determining that there is no data transmission on the SCG;
controlling the PSCell to enter an activated state when determining that there is data transmission on the SCG.

In an optional design, determining that there is no data transmission on the SCG, includes:
receiving, by the UE, an instruction for the SCG of the UE to enter the dormant state sent by a network-side device; and/or
receiving, by the UE, a PSCell synchronous reconfiguration message of the UE sent by the network-side device, wherein the PSCell is in the dormant state before receiving the message; and/or
determining, by the UE, that there is no data transmission on the SCG of the UE within a timing duration of a timer according to the timer configured by the network-side device for the UE.

In an optional design, after controlling the PSCell to enter the dormant state, the method further includes:
controlling each SCell in the SCG to enter a default state; or
controlling each SCell in the activated state in the SCG to enter the default state; or
controlling each SCell in the activated state in the SCG to enter the dormant state, and each SCell in the dormant state to enter a deactivated state;
wherein the default state is the dormant state or the deactivated state or a state maintained before receiving an instruction for the SCG to enter the dormant state.

In an optional design, if the instruction carries a target state of a target SCell in the SCG and the target state is the dormant state or deactivated state, after controlling the PSCell to enter the dormant state, the method further includes:
controlling each target SCell in the SCG to enter the target state indicated by the instruction, and controlling each non-target SCell in the SCG to enter the default state or controlling each non-target SCell in the activated state in the SCG to enter the default state or controlling each non-target SCell in the activated state in the SCG to enter the dormant state and each non-target SCell in the dormant state to enter the deactivated state;
wherein the default state is the dormant state or the deactivated state or a state maintained before receiving an instruction for the SCG to enter the dormant state.

In an optional design, determining, by the timer, that there is no data transmission on the SCG of the UE within a timing duration of the timer, includes:
determining, by the timer, that the UE has no downlink data transmission on the PSCell within the timing duration of the timer; or
determining, by the timer, that the UE has no uplink data and downlink data transmission on the PSCell within the timing duration of the timer; or
determining, by the timer, that the UE has no downlink data transmission on the SCG within the timing duration of the timer; or
determining, by the timer, that the UE has no uplink data and downlink data transmission on the SCG within the timing duration of the timer.

In an optional design, receiving, by the UE, an instruction for the SCG of the UE to enter the dormant state sent by a network-side device, includes:

receiving, by the UE, a Radio Resource Control (RRC) signaling for the SCG of the UE to enter the dormant state generated and sent by an MN; or receiving, by the UE, an RRC signaling for the SCG of the UE to enter the dormant state generated by an SN and sent through the MN; or receiving, by the UE, an RRC signaling for the SCG of the UE to enter the dormant state generated by an SN and sent through the SN; or receiving, by the UE, a Medium Access Control Control Element (MAC CE)/Downlink Control Information (DCI) signaling for the SCG of the UE to enter the dormant state generated and sent by the MN; or receiving, by the UE, an MAC CE/DCI signaling for the SCG of the UE to enter the dormant state generated and sent by the SN.

In an optional design, before determining whether there is data transmission on the SCG, the method further includes:

reporting, by the UE, a message supporting the SCG dormant state or supporting the PSCell dormant state to the network-side device.

In an optional design, after the PSCell enters the dormant state, the method further includes:

reporting, by the UE, a Channel State Information (CSI) measurement result of the PSCell and/or an SCell in the dormant state in the SCG through an MCG; and/or reporting, by the UE, a CSI measurement result of the PSCell through an SCell in the activated state in the SCG; and/or reporting a CSI measurement result of the PSCell and/or an SCell in the dormant state in the SCG through the PSCell in response to a Physical Uplink Control Channel (PUCCH) and/or Physical Uplink Shared Channel (PUSCH) of the PSCell of the UE being in the activated state; and/or reporting, by the UE, a Buffer Status Report (BSR) of the SN side through the MCG; and/or reporting, by the UE, a BSR of the SN side through an SCell in the activated state in the SCG; and/or reporting a BSR of the SN side through the PSCell in response to a PUCCH and/or PUSCH of the PSCell of the UE being in the activated state; and/or not monitoring, by the UE, a Physical Downlink Control Channel (PDCCH) of the PSCell; and/or not monitoring, by the UE, PDCCHs of all cells in the SCG.

In an optional design, determining that there is data transmission on the SCG, includes:

receiving, by the UE, an instruction for the SCG of the UE to enter the activated state sent by a network-side device; and/or receiving, by the UE, a PSCell synchronous reconfiguration message of the UE sent by the network-side device, wherein the PSCell is in the activated state before receiving the message.

In an optional design, receiving, by the UE, an instruction for the SCG of the UE to enter the activated state sent by a network-side device, includes:

receiving, by the UE, an RRC signaling for the SCG of the UE to enter the activated state generated and sent by an MN; or receiving, by the UE, an RRC signaling for the SCG of the UE to enter the activated state generated by an SN and sent through the MN; or receiving, by the UE, an MAC CE/DCI signaling for the SCG of the UE to enter the activated state generated and sent by the MN; or receiving, by the UE, an MAC CE/DCI signaling for the SCG of the UE to enter the activated state generated by an SN and sent through an SCell in the activated state of the SCG.

In a second aspect, the present application discloses an SCG state control method, which includes:

determining, by an MN, whether there is data transmission on an SCG of a UE;

controlling the SCG to enter a dormant state when determining that there is no data transmission on the SCG;

controlling the SCG to enter an activated state when determining that there is data transmission on the SCG.

In an optional design, the controlling the SCG to enter a dormant state, includes:

sending, by the MN, an instruction for the SCG of the UE to enter the dormant state to the UE, or configuring a timer for the UE, so that the UE controls a PSCell to enter the dormant state when receiving the instruction or determining that there is no data transmission on the SCG of the UE within a timing duration of the timer.

In an optional design, sending, by the MN, an instruction for the SCG of the UE to enter the dormant state to the UE, includes:

generating and sending, by the MN, an RRC signaling for the SCG of the UE to enter the dormant state to the UE; or sending, by the MN, an RRC signaling for the SCG of the UE to enter the dormant state generated by an SN to the UE; or generating and sending, by the MN, an MAC CE/DCI signaling for the SCG of the UE to enter the dormant state to the UE.

In an optional design, controlling, by the MN, the SCG to enter a dormant state when determining that there is no data transmission on the SCG of the UE, includes:

determining, by the MN, that the data transmission of the UE ends, and sending a first notification message to control the SCG of the UE to enter the dormant state to the SN, wherein the first notification message is sent by the MN after determining that the data transmission of the UE ends and notifies the SN that the SCG of the UE enters the dormant state; or determining, by the MN, that the data transmission of the UE ends, and sending a second notification message to control the SCG of the UE to enter the dormant state to the SN, wherein the second notification message is sent by the MN after determining that the data transmission of the UE ends and notifies the SN that the SCG of the UE can enter the dormant state; or receiving, by the MN, a third notification message that the SCG of the UE enters the dormant state sent by the SN, wherein the third notification message is sent by the SN after determining that the data transmission of the UE ends and notifies the MN that the SCG of the UE enters the dormant state; or receiving, by the MN, a fourth notification message that the SCG of the UE enters the dormant state sent by the SN, wherein the fourth notification message is sent by the SN after determining that the data transmission of the UE ends and notifies the MN that the SCG of the UE can enter the dormant state.

In an optional design, before controlling the SCG to enter the dormant state, the method further includes:

receiving a message supporting the SCG dormant state or supporting the PSCell dormant state reported by the UE.

In an optional design, after controlling the SCG to enter the dormant state, the method further includes:
- receiving a CSI measurement result of the PSCell reported by the UE; and/or
- receiving a BSR of the SN side reported by the UE; and/or
- receiving a CSI measurement result of an SCell in the dormant state in the SCG reported by the UE.

In an optional design, the controlling the SCG to enter an activated state, includes:
- sending, by the MN, an instruction for the SCG of the UE to enter the activated state to the UE, so that the UE controls the PSCell to enter the activated state.

In an optional design, sending, by the MN, an instruction for the SCG of the UE to enter the activated state to the UE, includes:
- generating and sending, by the MN, an RRC signaling for the SCG of the UE to enter the activated state to the UE; or
- sending, by the MN, an RRC signaling for the SCG of the UE to enter the activated state generated by an SN to the UE; or
- generating and sending, by the MN, an MAC CE/DCI signaling for the SCG of the UE to enter the activated state to the UE.

In an optional design, controlling, by the MN, the SCG to enter an activated state when determining that there is data transmission on the SCG of the UE, includes:
- determining, by the MN, that the UE resumes data transmission, and sending a fifth notification message to control the SCG of the UE to enter the activated state to the SN, wherein the fifth notification message is sent by the MN after determining that the UE resumes data transmission and notifies the SN that the SCG of the UE enters the activated state; or
- determining, by the MN, that the UE resumes data transmission, and sending a sixth notification message to control the SCG of the UE to enter the activated state to the SN, wherein the sixth notification message is sent by the MN after determining that the UE resumes data transmission and notifies the SN that the SCG of the UE can enter the activated state; or
- receiving, by the MN, a seventh notification message that the SCG of the UE enters the activated state sent by the SN, wherein the seventh notification message is sent by the SN after determining that the UE resumes data transmission and notifies the MN that the SCG of the UE enters the activated state; or
- receiving, by the MN, an eighth notification message that the SCG of the UE enters the activated state sent by the SN, wherein the eighth notification message is sent by the SN after determining that the UE resumes data transmission and notifies the MN that the SCG of the UE can enter or keep the activated state.

In a third aspect, the present application discloses an SCG state control method, which includes:
- determining, by an SN, whether there is data transmission on an SCG of a UE;
- controlling the SCG to enter a dormant state when determining that there is no data transmission on the SCG;
- controlling the SCG to enter an activated state when determining that there is data transmission on the SCG.

In an optional design, the controlling the SCG to enter a dormant state, includes:
- sending, by the SN, an instruction for the SCG of the UE to enter the dormant state to the UE, or configuring a timer for the UE, so that the UE controls a PSCell to enter the dormant state when receiving the instruction or determining that there is no data transmission on the SCG of the UE within a timing duration of the timer.

In an optional design, sending, by the SN, an instruction for the SCG of the UE to enter the dormant state to the UE, includes:
- generating and sending, by the SN, an RRC signaling for the SCG of the UE to enter the dormant state to the UE; or
- generating and sending, by the SN, an MAC CE/DCI signaling for the SCG of the UE to enter the dormant state to the UE.

In an optional design, controlling, by the SN, the SCG to enter a dormant state when determining that there is no data transmission on the SCG of the UE, includes:
- determining, by the SN, that the data transmission of the UE ends, controlling the SCG of the UE to enter the dormant state, and sending a third notification message that the SCG of the UE enters the dormant state to the MN, wherein the third notification message is sent by the SN after determining that the data transmission of the UE ends and notifies the MN that the SCG of the UE enters the dormant state; or
- determining, by the SN, that the data transmission of the UE ends, controlling the SCG of the UE to enter the dormant state, and sending a fourth notification message that the SCG of the UE enters the dormant state to the MN, wherein the fourth notification message is sent by the SN after determining that the data transmission of the UE ends and notifies the MN that the SCG of the UE can enter the dormant state; or
- receiving, by the SN, a first notification message that the SCG of the UE enters the dormant state sent by the MN, and controlling the SCG of the UE to enter the dormant state, wherein the first notification message is sent by the MN after determining that the data transmission of the UE ends and notifies the SN that the SCG of the UE enters the dormant state; or
- receiving, by the SN, a second notification message that the SCG of the UE enters the dormant state sent by the MN, and controlling the SCG of the UE to enter the dormant state, wherein the second notification message is sent by the MN after determining that the data transmission of the UE ends and notifies the SN that the SCG of the UE can enter the dormant state.

In an optional design, before controlling the SCG to enter the dormant state, the method further includes:
- receiving a message supporting the SCG dormant state or supporting the PSCell dormant state reported by the UE.

In an optional design, after controlling the SCG to enter the dormant state, the method further includes:
- receiving a CSI measurement result of the PSCell and/or an SCell in the dormant state in the SCG reported by the UE through the PSCell; and/or
- receiving a BSR of the SN side reported by the UE through the PSCell; and/or
- receiving a CSI measurement result of the PSCell reported by the UE through an SCell in the activated state in the SCG; and/or
- receiving a BSR of the SN side reported by the UE through an SCell in the activated state in the SCG.

In an optional design, the controlling the SCG to enter an activated state, includes:
- sending, by the SN, an instruction for the SCG of the UE to enter the activated state to the UE, so that the UE controls the PSCell to enter the activated state.

In an optional design, sending, by the SN, an instruction for the SCG of the UE to enter the activated state to the UE, includes:
  generating and sending, by the SN, an RRC signaling for the SCG of the UE to enter the activated state to the UE through the MN; or
  generating and sending, by the SN, an MAC CE/DCI signaling for the SCG of the UE to enter the activated state to the UE through an SCell in the activated state in the SCG.

In an optional design, controlling, by the SN, the SCG to enter an activated state when determining that there is data transmission on the SCG of the UE, includes:
  determining, by the SN, that the UE resumes data transmission, controlling the SCG of the UE to enter the activated state, and sending a seventh notification message that the SCG of the UE enters the activated state to the MN, wherein the seventh notification message is sent by the SN after determining that the UE resumes data transmission and notifies the MN that the SCG of the UE enters the activated state; or
  determining, by the SN, that the UE resumes data transmission, controlling the SCG of the UE to enter the activated state, and sending an eighth notification message that the SCG of the UE enters the activated state to the MN, wherein the eighth notification message is sent by the SN after determining that the UE resumes data transmission and notifies the MN that the SCG of the UE can enter or keep the activated state; or
  receiving, by the SN, a fifth notification message that the SCG of the UE enters the activated state sent by the MN, and controlling the SCG of the UE to enter the activated state, wherein the fifth notification message is sent by the MN after determining that the UE resumes data transmission and notifies the SN that the SCG of the UE enters the activated state; or
  receiving, by the SN, a sixth notification message that the SCG of the UE enters the activated state sent by the MN, and controlling the SCG of the UE to enter the activated state, wherein the sixth notification message is sent by the MN after determining that the UE resumes data transmission and notifies the SN that the SCG of the UE can enter or keep the activated state.

In a fourth aspect, the present application discloses an SCG state control apparatus, which is applied to a UE and includes:
  a detection module configured to determine whether there is data transmission on an SCG;
  a processing module configured to control a PSCell to enter a dormant state when a detection result of the detection module is no;
  the processing module is further configured to control the PSCell to enter an activated state when the detection result of the detection module is yes.

In an optional design, the detection module is specifically configured to determine that there is no data transmission on the SCG by: receiving an instruction for the SCG of the UE to enter the dormant state sent by a network-side device; and/or receiving a PSCell synchronous reconfiguration message of the UE sent by the network-side device, wherein the PSCell is in the dormant state before receiving the message; and/or determining that there is no data transmission on the SCG of the UE within a timing duration of a timer according to the timer configured by the network-side device for the UE.

In an optional design, the processing module is further configured to: control each SCell in the SCG to enter a default state; or control each SCell in the activated state in the SCG to enter the default state; or control each SCell in the activated state in the SCG to enter the dormant state, and each SCell in the dormant state to enter a deactivated state; wherein the default state is the dormant state or the deactivated state or a state maintained before receiving an instruction for the SCG to enter the dormant state.

In an optional design, the processing module is further configured to: if the instruction carries a target state of a target SCell in the SCG and the target state is the dormant state or deactivated state, control each target SCell in the SCG to enter the target state indicated by the instruction, and control each non-target SCell in the SCG to enter the default state or control each non-target SCell in the activated state in the SCG to enter the default state or control each non-target SCell in the activated state in the SCG to enter the dormant state and each non-target SCell in the dormant state to enter the deactivated state; wherein the default state is the dormant state or the deactivated state or a state maintained before receiving an instruction for the SCG to enter the dormant state.

In an optional design, the timer determines that there is no data transmission on the SCG of the UE within a timing duration of the timer, including: the timer determines that the UE has no downlink data transmission on the PSCell within the timing duration of the timer; or the timer determines that the UE has no uplink data and downlink data transmission on the PSCell within the timing duration of the timer; or the timer determines that the UE has no downlink data transmission on the SCG within the timing duration of the timer; or the timer determines that the UE has no uplink data and downlink data transmission on the SCG within the timing duration of the timer.

In an optional design, the receiving an instruction for the SCG of the UE to enter the dormant state sent by a network-side device, includes: receiving an RRC signaling for the SCG of the UE to enter the dormant state generated and sent by an MN; or receiving an RRC signaling for the SCG of the UE to enter the dormant state generated by an SN and sent through the MN; or receiving an RRC signaling for the SCG of the UE to enter the dormant state generated by an SN and sent through the SN; or receiving an MAC CE/DCI signaling for the SCG of the UE to enter the dormant state generated and sent by the MN; or receiving an MAC CE/DCI signaling for the SCG of the UE to enter the dormant state generated and sent by the SN.

In an optional design, the apparatus further includes:
  a sending module configured to report a message supporting the SCG dormant state or supporting the PSCell dormant state to the network-side device.

In an optional design, the sending module is further configured to: report a CSI measurement result of the PSCell and/or an SCell in the dormant state in the SCG through an MCG; and/or report a CSI measurement result of the PSCell through an SCell in the activated state in the SCG; and/or report a CSI measurement result of the PSCell and/or an SCell in the dormant state in the SCG through the PSCell in response to a PUCCH and/or PUSCH of the PSCell of the UE being in the activated state; and/or report a BSR of the SN side through the MCG; and/or report a BSR of the SN side through an SCell in the activated state in the SCG; and/or report a BSR of the SN side through the PSCell in response to a PUCCH and/or PUSCH of the PSCell of the UE being in the activated state; and/or not monitor a PDCCH of the PS Cell; and/or not monitor PDCCHs of all cells in the SCG.

In an optional design, the detection module is specifically configured to determine that there is data transmission on the SCG by: receiving an instruction for the SCG of the UE to enter the activated state sent by a network-side device; and/or receiving a PSCell synchronous reconfiguration message of the UE sent by the network-side device, wherein the PSCell is in the activated state before receiving the message.

In an optional design, the receiving an instruction for the SCG of the UE to enter the activated state sent by a network-side device, includes: receiving an RRC signaling for the SCG of the UE to enter the activated state generated and sent by an MN; or receiving an RRC signaling for the SCG of the UE to enter the activated state generated by an SN and sent through the MN; or receiving an MAC CE/DCI signaling for the SCG of the UE to enter the activated state generated and sent by the MN; or receiving an MAC CE/DCI signaling for the SCG of the UE to enter the activated state generated by an SN and sent through an SCell in the activated state of the SCG.

In a fifth aspect, the present application discloses an SCG state control apparatus, which is applied to an MN and includes:
a detection module configured to determine whether there is data transmission on an SCG of a User Equipment, UE;
a control module configured to control the SCG to enter a dormant state when a detection result of the detection module is no;
the control module is further configured to control the SCG to enter an activated state when the detection result of the detection module is yes.

In an optional design, the control module is specifically configured to: send an instruction for the SCG of the UE to enter the dormant state to the UE, or configure a timer for the UE, so that the UE controls a PSCell to enter the dormant state when receiving the instruction or determining that there is no data transmission on the SCG of the UE within a timing duration of the timer.

In an optional design, the control module is specifically configured to: generate and send an RRC signaling for the SCG of the UE to enter the dormant state to the UE; or send an RRC signaling for the SCG of the UE to enter the dormant state generated by an SN to the UE; or generate and send an MAC CE/DCI signaling for the SCG of the UE to enter the dormant state to the UE.

In an optional design, the control module is specifically configured to: determine that the data transmission of the UE ends, and send a first notification message to control the SCG of the UE to enter the dormant state to the SN, wherein the first notification message is sent by the MN after determining that the data transmission of the UE ends and notifies the SN that the SCG of the UE enters the dormant state; or determine that the data transmission of the UE ends, and send a second notification message to control the SCG of the UE to enter the dormant state to the SN, wherein the second notification message is sent by the MN after determining that the data transmission of the UE ends and notifies the SN that the SCG of the UE can enter the dormant state; or receive a third notification message that the SCG of the UE enters the dormant state sent by the SN, wherein the third notification message is sent by the SN after determining that the data transmission of the UE ends and notifies the MN that the SCG of the UE enters the dormant state; or receive a fourth notification message that the SCG of the UE enters the dormant state sent by the SN, wherein the fourth notification message is sent by the SN after determining that the data transmission of the UE ends and notifies the MN that the SCG of the UE can enter the dormant state.

In an optional design, the apparatus further includes:
a receiving module configured to receive a message supporting the SCG dormant state or supporting the PSCell dormant state reported by the UE.

In an optional design, the receiving module is further configured to: receive a CSI measurement result of the PSCell reported by the UE; and/or receive a BSR of the SN side reported by the UE; and/or receive a CSI measurement result of an SCell in the dormant state in the SCG reported by the UE.

In an optional design, the control module is specifically configured to send an instruction for the SCG of the UE to enter the activated state to the UE, so that the UE controls the PSCell to enter the activated state.

In an optional design, the control module is specifically configured to: generate and send an RRC signaling for the SCG of the UE to enter the activated state to the UE; or send an RRC signaling for the SCG of the UE to enter the activated state generated by an SN to the UE; or generate and send an MAC CE/DCI signaling for the SCG of the UE to enter the activated state to the UE.

In an optional design, the control module is specifically configured to: determine that the UE resumes data transmission, and send a fifth notification message to control the SCG of the UE to enter the activated state to the SN, wherein the fifth notification message is sent by the MN after determining that the UE resumes data transmission and notifies the SN that the SCG of the UE enters the activated state; or determine that the UE resumes data transmission, and send a sixth notification message to control the SCG of the UE to enter the activated state to the SN, wherein the sixth notification message is sent by the MN after determining that the UE resumes data transmission and notifies the SN that the SCG of the UE can enter the activated state; or receive a seventh notification message that the SCG of the UE enters the activated state sent by the SN, wherein the seventh notification message is sent by the SN after determining that the UE resumes data transmission and notifies the MN that the SCG of the UE enters the activated state; or receive an eighth notification message that the SCG of the UE enters the activated state sent by the SN, wherein the eighth notification message is sent by the SN after determining that the UE resumes data transmission and notifies the MN that the SCG of the UE can enter or keep the activated state.

In a sixth aspect, the present application discloses an SCG state control apparatus, which is applied to an SN and includes:
a detection module configured to detect whether there is data transmission on an SCG of a User Equipment, UE;
a control module configured to control the SCG to enter a dormant state when a detection result of the detection module is no;
the control module is further configured to control the SCG to enter an activated state when the detection result of the detection module is yes.

In an optional design, the control module is specifically configured to: send an instruction for the SCG of the UE to enter the dormant state to the UE, or configure a timer for the UE, so that the UE controls a PSCell to enter the dormant state when receiving the instruction or determining that there is no data transmission on the SCG of the UE within a timing duration of the timer.

In an optional design, the control module is specifically configured to: generate and send an RRC signaling for the SCG of the UE to enter the dormant state to the UE; or generate and send an MAC CE/DCI signaling for the SCG of the UE to enter the dormant state to the UE.

In an optional design, the control module is specifically configured to: determine that the data transmission of the UE ends, control the SCG of the UE to enter the dormant state, and send a third notification message that the SCG of the UE enters the dormant state to the MN, wherein the third notification message is sent by the SN after determining that the data transmission of the UE ends and notifies the MN that the SCG of the UE enters the dormant state; or determine that the data transmission of the UE ends, control the SCG of the UE to enter the dormant state, and send a fourth notification message that the SCG of the UE enters the dormant state to the MN, wherein the fourth notification message is sent by the SN after determining that the data transmission of the UE ends and notifies the MN that the SCG of the UE can enter the dormant state; or receive a first notification message that the SCG of the UE enters the dormant state sent by the MN, and control the SCG of the UE to enter the dormant state, wherein the first notification message is sent by the MN after determining that the data transmission of the UE ends and notifies the SN that the SCG of the UE enters the dormant state; or receive a second notification message that the SCG of the UE enters the dormant state sent by the MN, and control the SCG of the UE to enter the dormant state, wherein the second notification message is sent by the MN after determining that the data transmission of the UE ends and notifies the SN that the SCG of the UE can enter the dormant state.

In an optional design, the apparatus further includes:
a receiving module configured to receive a message supporting the SCG dormant state or supporting the PSCell dormant state reported by the UE.

In an optional design, the receiving module is further configured to: receive a CSI measurement result of the PSCell and/or an SCell in the dormant state in the SCG reported by the UE through the PSCell; and/or receive a BSR of the SN side reported by the UE through the PSCell; and/or receive a CSI measurement result of the PSCell reported by the UE through an SCell in the activated state in the SCG; and/or receive a BSR of the SN side reported by the UE through an SCell in the activated state in the SCG.

In an optional design, the control module is specifically configured to send an instruction for the SCG of the UE to enter the activated state to the UE, so that the UE controls the PSCell to enter the activated state.

In an optional design, the control module is specifically configured to: generate and send an RRC signaling for the SCG of the UE to enter the activated state to the UE through the MN; or generate and send an MAC CE/DCI signaling for the SCG of the UE to enter the activated state to the UE through an SCell in the activated state in the SCG.

In an optional design, the control module is specifically configured to: determine that the UE resumes data transmission, control the SCG of the UE to enter the activated state, and send a seventh notification message that the SCG of the UE enters the activated state to the MN, wherein the seventh notification message is sent by the SN after determining that the UE resumes data transmission and notifies the MN that the SCG of the UE enters the activated state; or determine that the UE resumes data transmission, control the SCG of the UE to enter the activated state, and send an eighth notification message that the SCG of the UE enters the activated state to the MN, wherein the eighth notification message is sent by the SN after determining that the UE resumes data transmission and notifies the MN that the SCG of the UE can enter or keep the activated state; or receive a fifth notification message that the SCG of the UE enters the activated state sent by the MN, and control the SCG of the UE to enter the activated state, wherein the fifth notification message is sent by the MN after determining that the UE resumes data transmission and notifies the SN that the SCG of the UE enters the activated state; or receive a sixth notification message that the SCG of the UE enters the activated state sent by the MN, and control the SCG of the UE to enter the activated state, wherein the sixth notification message is sent by the MN after determining that the UE resumes data transmission and notifies the SN that the SCG of the UE can enter or keep the activated state.

In a seventh aspect, the present application discloses a UE, including: a processor, a memory and a transceiver;
the memory is configured to store computer instructions;
the processor is configured to run the computer instructions to implement the method described in the first aspect or any one of the optional designs of the first aspect described above;
the transceiver is configured to receive and send data under control of the processor.

In an eighth aspect, the present application discloses an MN, including: a processor, a memory and a transceiver;
the memory is configured to store computer instructions;
the processor is configured to run the computer instructions to implement the method described in the second aspect or any one of the optional designs of the second aspect described above;
the transceiver is configured to receive and send data under control of the processor.

In a ninth aspect, the present application discloses an SN, including: a processor, a memory and a transceiver;
the memory is configured to store computer instructions;
the processor is configured to run the computer instructions to implement the method described in the third aspect or any one of the optional designs of the third aspect described above;
the transceiver is configured to receive and send data under control of the processor.

In a tenth aspect, the present application discloses a computer readable storage medium storing computer instructions that, when executed by a processor of a UE, implement the method described in the first aspect or any one of the optional designs of the first aspect described above.

In an eleventh aspect, the present application discloses a computer readable storage medium storing computer instructions that, when executed by a processor of an MN, implement the method described in the second aspect or any one of the optional designs of the second aspect described above.

In a twelfth aspect, the present application discloses a computer readable storage medium storing computer instructions that, when executed by a processor of an SN, implement the method described in the third aspect or any one of the optional designs of the third aspect described above.

The present application has the following beneficial effects.

In the embodiments of the present application, when determining that there is no data transmission on the SCG, the UE controls the PSCell to enter the dormant state, avoiding the waste of power consumption without a need to release the SCG, so that there is no need to reconfigure the SCG when initiating the data transmission again on the SCG side, and the data transmission is scheduled in the SCG in time according to the CSI measurement result reported in the dormant state, reducing the data transmission delay and providing a solution to quickly resume the data transmission while saving energy.

BRIEF DESCRIPTION OF THE DRAWINGS

In order to illustrate the embodiments of the present application or the technical solutions in the prior art more clearly, the accompanying figures which need to be used in describing the embodiments or the prior art will be introduced below briefly. Obviously the accompanying figures described below are some embodiments of the present application, and other accompanying figures can also be obtained by those ordinary skilled in the art according to these accompanying figures without creative labor.

DETAILED DESCRIPTION OF THE EMBODIMENTS

Figure 1:
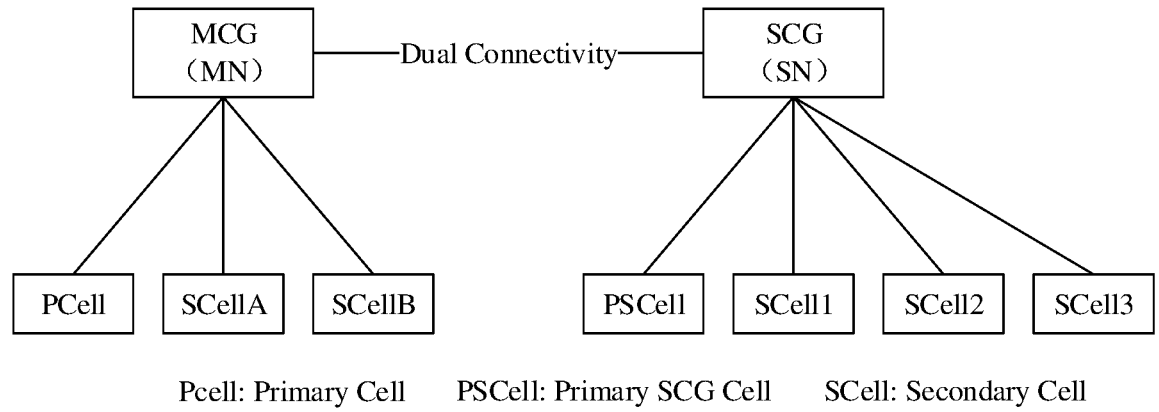
FIG. 1 is a schematic diagram of UE access under DC provided by an embodiment of the present application.

In order to make the purposes, technical solutions and advantages of the embodiments of the present application clearer, the technical solutions in the embodiments of the present application will be described clearly and completely below in combination with the accompanying drawings in the embodiments of the present application. Obviously the described embodiments are a part of the embodiments of the present application but not all the embodiments. Based upon the embodiments of the present application, all of other embodiments obtained by those ordinary skilled in the art without creative work pertain to the protection scope of the present application.

In the following, some terms in the embodiments of the present application are explained so as to facilitate the understanding of those skilled in the art.

(1) User Equipment (UE), also known as terminal, Mobile Station (MS), Mobile Terminal (MT), etc., is a device that can provide users with voice and/or data connectivity. For example, the user equipment includes a handheld device with wireless connection function, a vehicle-mounted device, etc. At present, the user equipment may be: mobile phone, tablet, laptop, palmtop computer, Mobile Internet Device (MID), wearable device, Virtual Reality (VR) device, Augmented Reality (AR) device, wireless terminal in the industrial control, wireless terminal in the self driving, wireless terminal in the smart grid, wireless terminal in the transportation safety, wireless terminal in the smart city, or wireless terminal in the smart home, etc.

(2) Dormant state and deactivated state. In the Long Term Evolution (LTE), the CA enhancement project of the 5G first phase standard (R15) introduces a dormant state for the Secondary Cell (SCell). Compared with the activated state, the SCell in the dormant state does not need to monitor and parse the Physical Downlink Control Channel (PDCCH) but needs to perform the Radio Resource Control (RRC) and the periodic Channel Quality Indicator (CQI) measurement and reporting, so that the UE can be scheduled to resume the data transmission as soon as possible when the SCell is activated. If the SCell is configured with a PUCCH, the SCell is not allowed to enter the dormant state. For example, if the SCell is configured with a PUCCH, it is only allowed to enter the activated or deactivated state, and is not allowed to enter the dormant state. The network-side device can configure a timer for the UE, allowing the UE to control the SCell to transition from the activated state to the dormant state and from the dormant state to the deactivated state through the timer. The SCell does not perform the CQI measurement and reporting in the deactivated state relative to the dormant state. The introduction of the dormant state of the SCell can enable the UE to recover to the data scheduling state more quickly.

(3) Network-side device: the network-side device in the embodiments of the present application refers to MN and SN, and may also be called network side for short, wherein the MN may also be referred to as master node, and the SN may also be referred to as secondary node.

(4) "and/or" describes the association relationship of the associated objects, and indicates that there may be three relationships, for example, A and/or B may represent: only A, both A and B, and only B. The character "/" generally indicates that the associated objects have a kind of "or" relationship.

Furthermore, it should be understood that the word such as "first" or "second" in the description of the present application is only for purpose of distinguishing the description, and cannot be construed to indicate or imply the relative importance and cannot be construed to indicate or imply the order either; and "multiple" involved in the present application refers to two or more.

It should be understood that the technical solutions of the invention can be applied to various communication systems, for example, Global System of Mobile communication (GSM) system, Code Division Multiple Access (CDMA) system, Wideband Code Division Multiple Access (WCDMA) system, General Packet Radio Service (GPRS), Long Term Evolution (LTE) system, Advanced long term evolution (LTE-A) system, Universal Mobile Telecommunication System (UMTS), New Radio (NR) and the like.

It should be further understood that the User Equipment (UE) includes but not limited to a Mobile Station (MS), a mobile terminal, a mobile telephone, a handset, a portable equipment or the like in the embodiments of the invention. This user equipment may communicate with one or more core networks via the Radio Access Network (RAN), for example, the user equipment may be a mobile telephone (or called "cellular" telephone), a computer with the wireless communication function, or the like. The user equipment may also be a portable, pocket, handheld, computer built-in or vehicle-carried mobile device.

In some embodiments of the invention, the base station (e.g., access point) may mean the device in the access network communicating with the wireless terminal via one or more sectors over the air interface. The base station may be used to perform the inter-conversion between the received air frame and the IP packet, and used as the router between the wireless terminal and the rest of the access network, wherein the rest of the access network may include Internet Protocol (IP) networks. The base station may further coordinate the attribute management of the air interface. For example, the base station may be the Base Transceiver Station (BTS) in the GSM or CDMA, or may be the NodeB in the TD-SCDMA or WCDMA, or may be the evolutional Node B (eNodeB or eNB or e-NodeB) in the LTE, or may be the gNB in the 5G NR, which is not limited in the invention.

Some embodiments of the present application will be described below in detail with reference to the drawings.

Embodiment 1

FIG. 1 is a schematic diagram of UE access under DC provided by an embodiment of the present application. As shown in FIG. 1, the UE accesses an MN under the DC, and the MN configures the MCG configuration information for the UE. At the same time, the UE accesses an SN, and the MN or SN configures the SCG configuration information for the UE. In this embodiment, the MCG includes Primary Cell (PCell), SCellA and SCellB; the SCG includes PSCell, SCell1, SCell2 and SCell3, and the PSCell is the primary SCG cell. It should be understood that the embodiment of the present application may also be applicable to but not limited to the UE access architecture shown in FIG. 1.

Figure 2:
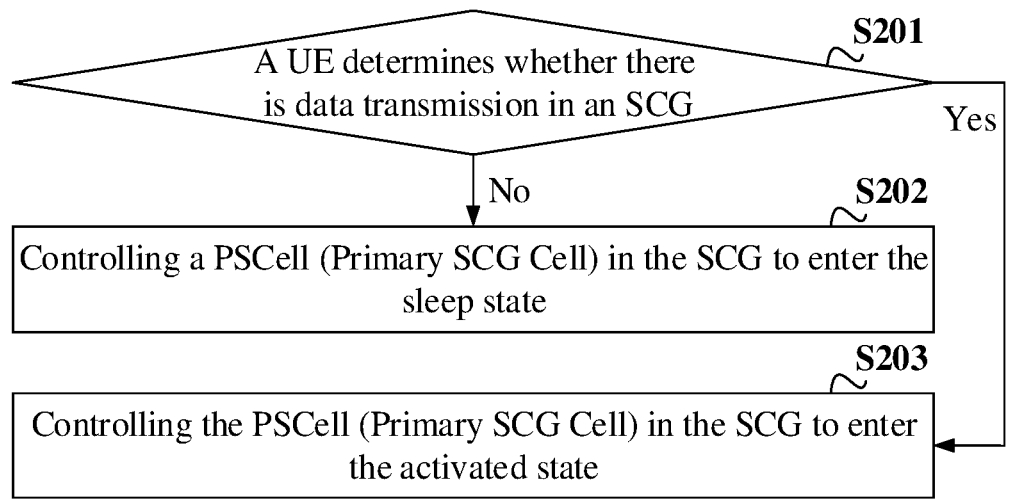
FIG. 2 is a first schematic diagram of an SCG state control process provided by an embodiment of the present application.

FIG. 2 is a schematic diagram of a SCG state control method provided by an embodiment of the present application, where the method includes:
- S201: a UE determines whether there is data transmission on an SCG, if not, proceed to S202; if so, proceed to S203;
- S202: controlling a PSCell to enter the dormant state;
- S203: controlling the PSCell to enter the activated state.

In some embodiments of the present application, if the network side configures the SCG for the UE, when it is determined that there is no data transmission on the SCG, it is determined that the SCG needs to be controlled to enter the dormant state, and the UE controls the PSCell to enter the dormant state to avoid the waste of power consumption; when it is determined that there is data transmission on the SCG, it is determined that the SCG needs to be controlled to enter the activated state, and the UE controls the PSCell to enter the activated state so as to schedule the data normally. The following description is made on both sides of entering the dormant state and entering the activated state.

Side of Entering the Dormant State.

Optionally, the UE may determine that there is no data transmission on the SCG and need to control the SCG to enter the dormant state in any one or a combination of the following ways.

First Way.

The UE receives an instruction for the SCG of the UE to enter the dormant state sent by a network-side device.

Optionally, when the network-side device configures the SCG for the UE and the SCG is in the activated state (PSCell is in the activated state), the network-side device may send an instruction for the SCG of the UE to enter the dormant state to the UE by way of RRC signaling or MAC Control Element (MAC CE)/Downlink Control Information (DCI) signaling. The ways of RRC signaling and MAC CE/DCI signaling will be specifically illustrated below.

(1) The Ways of RRC Signaling Include the Following Ways (RRC Signaling Ways):

In a first way: the MN generates the RRC signaling for the SCG of the UE to enter the dormant state and sends it to the UE through the MN side, and the UE receives the RRC signaling for the SCG of the UE to enter the dormant state generated and sent by the MN; or In a second way: the SN generates the RRC signaling for the SCG of the UE to enter the dormant state and always sends it to the UE through the MN side, and the UE receives the RRC signaling for the SCG of the UE to enter the dormant state generated by the SN and sent through the MN; or In a third way: the SN generates the RRC signaling for the SCG of the UE to enter the dormant state; if the SN is configured with SRB3, it can be sent to the UE through the SN side, and the UE receives the RRC signaling for the SCG of the UE to enter the dormant state generated by the SN and sent through the SN; if the SN is not configured with SRB3, the SN sends the generated RRC signaling for the SCG of the UE to enter the dormant state to the UE through the MN side, and the UE receives the RRC signaling for the SCG of the UE to enter the dormant state generated by the SN and sent through the MN.

Optionally, only the network device MN or SN can generate the RRC signaling for the SCG of the UE to enter the dormant state, or the network-side devices MN and SN can both generate the RRC signaling for the SCG of the UE to enter the dormant state, and send the RRC signaling to the UE in the first to third ways described above, wherein the RRC signaling may carry the identification information indicating that the SCG of the UE enters the dormant state, or the SCG of the UE enters the dormant state when the designated signaling is received. For example, if a synchronous reconfiguration message of the SCG is received, the UE defaults that the SCG is in the dormant state after completing the synchronous reconfiguration.

(2) The Ways of MAC CE or DCI Signaling Include the Following Ways (MAC CE or DCI Signaling Ways):

In a first way: the MN generates the MAC CE/DCI signaling for the SCG of the UE to enter the dormant state and sends it to the UE through the MN side, and the UE receives the MAC CE/DCI signaling for the SCG of the UE to enter the dormant state generated and sent by the MN, wherein the DCI signaling may be the PDCCH command of the PCell or any PDCCH command of the MCG to activate the Cell;

In a second way: the SN generates the MAC CE/DCI signaling for the SCG of the UE to enter the dormant state and sends it to the UE through the SN side, and the UE receives the MAC CE/DCI signaling for the SCG of the UE to enter the dormant state generated and sent by the SN, wherein the DCI signaling may be the PDCCH command of the PSCell or any PDCCH command for the SCG to activate the Cell.

Optionally, only the network-side device MN or SN can generate the MAC CE/DCI signaling for the SCG of the UE to enter the dormant state, or both the network-side devices MN and SN generate the MAC CE/DCI signaling for the SCG of the UE to enter the dormant state, and send the MAC CE/DCI signaling to the UE in the first to second ways described above.

Optionally, the scenarios where the network notifies the SCG state change will be specifically illustrated respectively in combination with the scene when the SCG is added and changed and when the SCG is not changed.

The following ways are included when an SCG is added for a UE (the UE accesses the SCG) and/or the SN changes and/or the PSCell changes.

In a First Way: Only Enter the Default State.

When an SCG is added and/or the SN changes and/or the PSCell changes, the SCG enters the default state, wherein the default state is the dormant state or activated state. The network-side device can set the default state of the SCG of the UE as the default state when an SCG is added and/or the SN changes and/or the PSCell changes through signaling, or the protocol specifies the default state when an SCG is added and/or the SN changes and/or the PSCell changes. When the default state is the dormant state, the UE controls the SCG to enter the default state when an SCG is added and/or the SN changes and/or the PSCell changes.

In a Second Way: The SCG State Must be Set Through Signaling.

When an SCG is added and/or the SN changes and/or the PSCell changes, the synchronous reconfiguration message of the SCG sent by the network-side device includes the state identifier of the SCG. If the state of the SCG is designated as the dormant state, the UE controls the SCG to enter the dormant state; if the state of the SCG is designated as the activated state, and the UE controls the SCG to enter the activated state.

In a Third Way: The SCG State can be Set Through Signaling, or the SCG State can be Set Through the Default State.

When an SCG is added and/or the SN changes and/or the PSCell changes, the synchronous reconfiguration message of the SCG sent by the network-side device may include the state identifier of the SCG, or may not include the state identifier of the SCG. Specifically, if the reconfiguration message to add the SCG includes the state identifier of the SCG, and if the state of the SCG is designated as the dormant state, the UE controls the SCG to enter the dormant state, and if the state of the SCG is designated as the activated state, the UE controls the SCG to enter the activated state; if the synchronous reconfiguration message of the SCG does not include the state identifier of the SCG, the UE controls the SCG to enter the default state, wherein the default state is the dormant state or activated state. Same as the first way, the default state may be set by the network or may be specified by protocol.

The scenarios where the network notifies the SCG state change without the SCG change include the following ways.

In a First Way: RRC Signaling.

The network side determines that there is no data transmission on the SCG side, or the network side decides not to transmit data on the SCG side due to reasons such as energy saving or overheating or bearer allocation, so the network-side device sends the RRC signaling carrying the indication information that the SCG of the UE enters the dormant state. The signaling may be an RRC reconfiguration message, or a prescribed RRC signaling message for SCG state change. The UE controls the SCG to enter the dormant state after receiving the RRC signaling carrying the indication information that the SCG of the UE enters the dormant state.

In a Second Way: MAC CE or DCI.

The network side determines that there is no data transmission on the SCG side, or the network side decides not to transmit data on the SCG side due to reasons such as energy saving or overheating or bearer allocation. The network-side device sends the MAC CE or DCI signaling carrying the indication information that the SCG of the UE enters the dormant state. The UE controls the SCG to enter the dormant state after receiving the MAC CE or DCI signaling carrying the indication information that the SCG of the UE enters the dormant state.

Second Way.

The UE receives a PSCell synchronous reconfiguration message of the UE sent by the network-side device, and the PSCell is in the activated state before receiving the message.

Optionally, the network-side device notifies the UE to perform the PSCell change by sending the PSCell synchronous reconfiguration message for the UE. The default state of the SCG when the UE performs the PSCell change is the state of the source (before the change) SCG, that is, the state of the SCG after the change is consistent with the state of the SCG before the change. If the state of the source SCG is the dormant state, the state of the changed SCG is also the dormant state; if the state of the source SCG is the activated state, the state of the changed SCG is also the activated state, that is, the state of the PSCell of the changed SCG is synchronized with the state of the PSCell of the source SCG. If the PSCell is in the dormant state before the UE receives the message, it is determined that there is no data transmission on the SCG side, then there is no data transmission on the changed SCG, and then the SCG is controlled to enter the dormant state; if the PSCell is in the activated state before receiving the message, it is determined that there is data transmission on the changed SCG, and the SCG needs to be controlled to enter the activated state.

Third Way.

The UE determines that there is no data transmission on the SCG of the UE within the timing duration of a timer according to the timer configured by the network-side device for the UE (timer mode).

Here, the timer determines that there is no data transmission on the SCG of the UE within the timing duration of the timer, including:

the timer determines that the UE has no downlink data transmission on the PSCell within the timing duration of the timer; or the timer determines that the UE has no uplink data and downlink data transmission on the PSCell within the timing duration of the timer; or the timer determines that the UE has no downlink data transmission on the SCG within the timing duration of the timer; or the timer determines that the UE has no uplink data and downlink data transmission on the SCG within the timing duration of the timer.

In an embodiment of the present application, the MN or SN can configure a timer for the UE, and the UE can detect the duration in which the PSCell has no downlink data transmission and/or the duration in which the PSCell has no uplink data and downlink data transmission and/or the duration in which the SCG has no downlink data transmission and/or the duration in which the SCG has no uplink data and downlink data transmission through the timer, and then determine whether there is data transmission on the SCG.

(1) When the timer detects the duration in which the PSCell has no downlink data transmission, the timer is restarted as long as the PSCell has downlink data transmission, and the time recorded by the timer is reset to zero. If the timer expires, that is, the time recorded by the timer exceeds the timing duration, it can be determined that the UE has no downlink data transmission on the PSCell within the timing duration of the timer.

(2) When the timer detects the duration in which the PSCell has no uplink data and downlink data transmission, the timer is restarted as long as the PSCell has uplink data or downlink data transmission, and the time recorded by the timer is reset to zero. If the timer expires, it can be determined that the UE has no uplink data and downlink data transmission on the PSCell within the timing duration of the timer.

(3) When the timer detects the duration in which the SCG has no downlink data transmission, the timer is restarted as long as the PSCell has downlink data transmission or any SCell in the SCG has downlink data transmission, and the time recorded by the timer is reset to zero. If the timer expires, it can be determined that the UE has no downlink data transmission on the SCG within the timing duration of the timer.

(4) When the timer detects the duration in which the SCG has no uplink data and downlink data transmission, the timer is restarted as long as the PSCell has uplink data or downlink data transmission or any SCell in the SCG has uplink data or downlink data transmission, and the time recorded by the timer is reset to zero. If the timer expires, it can be determined that the UE has no uplink data and downlink data transmission on the SCG within the timing duration of the timer.

Furthermore, in one way, the UE can start the timer only when none of the SCells in the SCG is in the activated state (the SCells in the SCG are all in the dormant state, or the SCells in the SCG are all in the deactivated state, or some SCells in the SCG are in the dormant state and the remaining SCells are in the deactivated state).

In another way, when there is a SCell in the activated state in the SCG, the timer can also be started.

In an embodiment of the present application, when the UE determines that there is no data transmission on the SCG in the above ways and needs to control the SCG to enter the dormant state, the UE can only control the PSCell to enter the dormant state, that is, the dormant state of the SCG is only applied to the PSCell; or can control the PSCell to enter the dormant state and control the SCell in the SCG to enter the dormant state or deactivated state, that is, the dormant state of the SCG is applied to all cells of the SCG, which will be illustrated below in combination with specific examples.

First Way.

When it is determined that there is no data transmission on the SCG and the SCG needs to be controlled to enter the dormant state, only the PSCell is controlled to enter the dormant state.

As shown in FIG. 1, a UE is configured with an SCG, which is configured with three SCells, namely SCell1, SCell2 and SCell3, wherein the SCell1 is in the activated state, the SCell2 is in the dormant state, and the SCell3 is in the deactivated state.

When the UE determines that there is no data transmission on the SCG and needs to control the SCG to enter the dormant state, the UE controls the PSCell to enter the dormant state, and does not control the states of the SCell1, SCell2 and SCell3, that is, the SCell1 remains in the activated state, the SCell2 remains in the dormant state, and the SCell3 remains in the deactivated state.

Second Way.

When it is determined that there is no data transmission on the SCG and the SCG needs to be controlled to enter the dormant state, the PSCell is controlled to enter the dormant state, and the SCells in the SCG are controlled to enter the dormant state or deactivate state.

As shown in FIG. 1, a UE is configured with an SCG, which is configured with three SCells, namely SCell1, SCell2 and SCell3, wherein the SCell1 is in the activated state, the SCell2 is in the dormant state, and the SCell3 is in the deactivated state. When the UE determines that there is no data transmission on the SCG and needs to control the SCG to enter the dormant state, the UE controls the PSCell to enter the dormant state, and then also needs to control the states of the SCell1, SCell2 and SCell3, so that the SCell1, SCell2 and SCell3 are in the dormant state or deactivated state.

Here, after the UE controls the PSCell to enter the dormant state, it controls the SCells in the SCG in the following ways.

In a first way: control each SCell in the SCG to enter the default state. There is a default state in the UE, where the default state is the dormant state or deactivated state or the state before receiving the instruction for the SCG to enter the dormant state. Taking the default state as the dormant state as an example, that is, after controlling the PSCell to enter the dormant state, the UE controls all of the SCell1, SCell2 and SCell3 to enter the dormant state.

In a second way: control each SCell in the activated state in the SCG to enter the default state. Still taking the default state as the dormant state as an example, that is, after controlling the PSCell to enter the dormant state, the UE controls the SCell1 in the activated state to enter the dormant state, the SCell2 remains in the dormant state, and the SCell3 remains in the deactivated state.

In a third way: control each SCell in the activated state in the SCG to enter the dormant state and each SCell in the dormant state to enter the deactivated state. That is, after controlling the PSCell to enter the dormant state, the UE controls the SCell1 to enter the dormant state and controls the SCell2 to enter the deactivated state, and the SCell3 remains in the deactivated state.

If it is determined that there is no data transmission on the SCG by receiving the instruction for the SCG of the UE to enter the dormant state sent by the network-side device, it is necessary to control the SCG to enter the dormant state, and the instruction carries the target state of the target SCell in the SCG, wherein the target state is the dormant state or deactivated state. After controlling the PSCell to enter the dormant state, the UE further controls the SCell in the SCG in the following ways.

In a fourth way: the target state of all the SCells must be clearly specified in the instruction, that is, the target state of the target SCell contained in the instruction covers all the SCells in the SCG, and each target SCell is controlled to enter the target state indicated by the instruction. If the instruction indicates that the SCell1 enters the deactivated state and the SCell2 and SCell3 enter the deactivated state, then the SCell1 is controlled to enter the deactivated state, and the SCell2 and SCell3 are controlled to enter the deactivated state.

In a fifth way: the instruction may contain the target state of a part of the SCells, that is, the contained target state of the target SCell covers a part of the SCells in the SCG, each target SCell is controlled to enter the target state indicated by the instruction, and each non-target SCell in the SCG is controlled to enter the default state. If the instruction indicates that the SCell1 enters the deactivated state, then the SCell1 is controlled to enter the deactivated state, and the SCell2 and SCell3 are controlled to enter the default state.

In a sixth way: the instruction may contain the target state of a part of the SCells, that is, the contained target state of the target SCell covers a part of the SCells in the SCG, each target SCell is controlled to enter the target state indicated by the instruction, and each non-target SCell in the activated state in the SCG is controlled to enter the default state. If the instruction indicates that the SCell1 enters the deactivated state, then the SCell1 is controlled to enter the deactivated state, and the SCell2 and SCell3 are in the dormant state and deactivated state respectively and remain unchanged.

In a seventh way: the instruction may contain the target state of a part of the SCells, that is, the contained target state of the target SCell covers a part of the SCells in the SCG, each target SCell is controlled to enter the target state indicated by the instruction, each non-target SCell in the activated state in the SCG is controlled to enter the dormant state, and each non-target SCell in the dormant state is controlled to enter the deactivated state. If the instruction indicates that the SCell1 enters the deactivated state, then the SCell1 is controlled to enter the deactivated state, the SCell2 enters the deactivated state, and the SCell3 remains the deactivated state.

If the target state of any target SCell is not contained in the instruction, the SCell in the SCG is controlled to enter the dormant state or deactivate state with reference to the first to third ways described above.

Specifically, after the PSCell enters the dormant state, the UE is further configured to:
report a Channel State Information (CSI) measurement result of the PSCell and/or an SCell in the dormant state in the SCG through the MCG; and/or
report a CSI measurement result of the PSCell through an SCell in the activated state in the SCG; and/or
report a CSI measurement result of the PSCell and/or an SCell in the dormant state in the SCG through the PSCell when the PUCCH and/or PUSCH of the PSCell of the UE is/are in the activated state; and/or
report a Buffer Status Report (BSR) of the SN side through the MCG; and/or
report a BSR of the SN side through an SCell in the activated state in the SCG; and/or
report a BSR of the SN side through the PSCell when a PUCCH and/or PUSCH of the PSCell of the UE is/are in the activated state; and/or
not monitor a PDCCH of the PSCell; and/or
not monitor PDCCHs of all cells in the SCG.

Take the CSI report of the SCG as an example:
after the SCG enters the dormant state (the PSCell enters the dormant state, and the secondary cells of the SCG enter the dormant state or deactivated state), the UE can only monitor the PDCCH of the MCG.

Furthermore, if the SCG enters the dormant state, the UE controls the PSCell to enter the dormant state and controls the SCells in the SCG to enter the dormant state or deactivate state. The UE can only monitor the PDCCH of the MCG in the downlink, and can only upload the CSI measurement report of the SCG through the PUCCH or Physical Uplink Shared Channel (PUSCH) of the MCG in the uplink and/or upload the CSI measurement report of the PSCell and the CSI measurement report of the SCell in the dormant state in the SCG through the PUCCH or PUSCH of the PSCell in the uplink.

The CSI measurement report on the SCG side includes the following ways.

In a first way: the UE uploads the CSI measurement report of the SCG through the MCG, and specifically uploads the CQI measurement report of the SCG through the PUCCH or PUSCH of the PCell or through the PUCCH or PUSCH of any cell of the MCG.

In a second way: the UE uploads the CSI measurement report of the PSCell on the PUCCH of the PSCell, that is, the PSCell enters the dormant state, and the PUCCH is in the activated state.

In a third way: the UE uploads the CSI measurement report of the PSCell and the CSI measurement report of the SCell in the dormant state on the PUCCH of the PSCell.

If the UE controls the PSCell to enter the dormant state and does not control the states of the SCells in the SCG, the UE can only monitor the PDCCH of the MCG and the PDCCHs of the activated SCells in the SCG in the downlink. The uplink can report the CSI measurement report of the cell in the dormant state in the SCG through the MCG; or report the CSI measurement report of the PSCell and/or the SCell in the dormant state in the SCG through the uplink of the PSCell; or report the CSI measurement report of the PSCell and/or other SCells in the dormant state in the SCG through the other activated SCell in the SCG.

The CSI measurement report on the SCG side includes the following ways.

In a first way: the UE uploads the CSI measurement report of the SCG through the MCG, and specifically uploads the CSI measurement report of the PSCell and/or the CSI measurement report of the specified SCell in the dormant state in the SCG through the PUCCH or PUSCH of the PCell or through the PUCCH or PUSCH of any cell of the MCG.

In a second way: the UE uploads the CSI measurement report of the PSCell on the PUCCH of the PSCell.

In a third way: the UE uploads the CSI measurement report of the PSCell and the CSI measurement report of the specified SCell in the dormant state on the PUCCH of the PSCell.

In a fourth way: the UE uploads the CSI measurement report of the PSCell on the PUCCH or PUSCH of the SCell in the activated state in the SCG.

In a fifth way: the UE uploads the CSI measurement report of the PSCell and the CSI measurement report of the SCell in the dormant state on the PUCCH or PUSCH of the SCell in the activated state in the SCG.

After the SCG of the UE enters the dormant state, the network-side device MN can further:
receive the CSI measurement result of the PSCell reported by the UE; and/or
receive the BSR of the SN side reported by the UE; and/or
receive the CSI measurement result of an SCell in the dormant state in the SCG reported by the UE.

After the SCG of the UE enters the dormant state, the network-side device SN can further:
receive the CSI measurement result of the PSCell and/or an SCell in the dormant state in the SCG reported by the UE through the PSCell; and/or
receive the BSR of the SN side reported by the UE through the PS Cell; and/or
receive a CSI measurement result of the PSCell reported by the UE through an SCell in the activated state in the SCG; and/or
receive a BSR of the SN side reported by the UE through an SCell in the activated state in the SCG.

In an embodiment of the present application, the reporting refers to sending a message to the network-side device MN and/or SN, and the CSI measurement report includes CQI and other parameters, which will not be repeated. After the SCG enters the dormant state, the network-side device obtains the CSI measurement result, BSR and other information related to the SCG, to facilitate the scheduling of the UE when there is data transmission on the SCG and reduce the data transmission delay.

Side of Entering the Activated State.

Optionally, the UE may determine that there is data transmission on the SCG and need to control the SCG to enter the activated state in any one or a combination of the following ways.

First Way.

The UE receives an instruction for the SCG of the UE to enter the activated state sent by a network-side device.

Optionally, when the network-side device configures the SCG for the UE and the SCG is in the dormant state (PSCell is in the dormant state), the network-side device may send an instruction for the SCG of the UE to enter the activated state to the UE by way of RRC signaling or MAC CE/DCI signaling. The ways of RRC signaling and MAC CE/DCI signaling will be specifically illustrated below.

(1) The Ways of RRC Signaling Include the Following Ways (RRC Signaling Ways):

In a first way: the MN generates the RRC signaling for the SCG of the UE to enter the activated state and sends it to the UE through the MN side, and the UE receives the RRC signaling for the SCG of the UE to enter the activated state generated and sent by the MN; or In a second way: the SN generates the RRC signaling for the SCG of the UE to enter the activated state and always sends it to the UE through the MN side, and the UE receives the RRC signaling for the SCG of the UE to enter the activated state generated by the SN and sent through the MN.

Optionally, only the network device MN or SN can generate the RRC signaling for the SCG of the UE to enter the activated state, or the network-side devices MN and SN can both generate the RRC signaling for the SCG of the UE to enter the activated state, and send the RRC signaling to the UE in the first to second ways described above, wherein the RRC signaling may carry the identification information indicating that the SCG of the UE enters the activated state, or the SCG of the UE enters the activated state when the designated signaling is received. For example, if a synchronous reconfiguration message of the SCG is received, the UE defaults that the SCG is in the activated state after completing the synchronous reconfiguration.

(2) The Ways of MAC CE or DCI Signaling Include the Following Ways (MAC CE or DCI Signaling Ways):

In a first way: the MN generates the MAC CE/DCI signaling for the SCG of the UE to enter the activated state and sends it to the UE through the MN side, and the UE receives the MAC CE/DCI signaling for the SCG of the UE to enter the activated state generated and sent by the MN, wherein the DCI signaling may be the PDCCH command of the PCell or any PDCCH command of the MCG to activate the Cell;

In a second way: the SN generates the MAC CE/DCI signaling for the SCG of the UE to enter the activated state and sends it to the UE through the SN side, and the UE receives the MAC CE/DCI signaling for the SCG of the UE to enter the activated state generated and sent by the SN, wherein the DCI signaling may be the PDCCH command for the SCG to activate the Cell.

Optionally, only the network-side device MN or SN can generate the MAC CE/DCI signaling for the SCG of the UE to enter the activated state, or both the network-side devices MN and SN generate the MAC CE/DCI signaling for the SCG of the UE to enter the activated state, and send the MAC CE/DCI signaling to the UE in the first to second ways described above.

Optionally, the scenarios where the network notifies the SCG state change will be specifically illustrated respectively in combination with the scene when the SCG is added and changed and when the SCG is not changed.

The following ways are included when an SCG is added for a UE (the UE accesses the SCG) and/or the SN changes and/or the PSCell changes.

In a First Way: Only Enter the Default State.

When an SCG is added and/or the SN changes and/or the PSCell changes, the SCG enters the default state, wherein the default state is the dormant state or activated state. The network-side device can set the default state of the SCG of the UE as the default state when an SCG is added and/or the SN changes and/or the PSCell changes through signaling, or the protocol specifies the default state when an SCG is added and/or the SN changes and/or the PSCell changes. When the default state is the activated state, the UE controls the SCG to enter the default state when an SCG is added and/or the SN changes and/or the PSCell changes.

IN A SECOND WAY: THE SCG STATE MUST BE SET THROUGH SIGNALING.

When an SCG is added and/or the SN changes and/or the PSCell changes, the synchronous reconfiguration message of the SCG sent by the network side includes the state identifier of the SCG. If the state of the SCG is designated as the dormant state, the UE controls the SCG to enter the dormant state; if the state of the SCG is designated as the activated state, and the UE controls the SCG to enter the activated state.

In a Third Way: The SCG State can be Set Through Signaling, or the SCG State can be Set Through the Default State.

When an SCG is added and/or the SN changes and/or the PSCell changes, the synchronous reconfiguration message of the SCG sent by the network may include the state identifier of the SCG, or may not include the state identifier of the SCG. Specifically, if the reconfiguration message to add the SCG includes the state identifier of the SCG, and if the state of the SCG is designated as the dormant state, the UE controls the SCG to enter the dormant state, and if the state of the SCG is designated as the activated state, the UE controls the SCG to enter the activated state; if the synchronous reconfiguration message of the SCG does not include the state identifier of the SCG, the UE controls the SCG to enter the default state, wherein the default state is the dormant state or activated state. Same as the first way, the default state may be set by the network or may be specified by protocol.

The scenarios where the network notifies the SCG state change without the SCG change include the following ways.

In a First Way: RRC Signaling.

The network side determines that there is data transmission on the SCG side, or the network side decides to transmit data on the SCG side due to reasons such as bearer allocation, and thus sends the RRC signaling carrying the indication information that the SCG of the UE enters the activated state. The signaling may be an RRC reconfiguration message, or a prescribed RRC signaling message for SCG state change. The UE controls the SCG to enter the activated state after receiving the RRC signaling carrying the indication information that the SCG of the UE enters the activated state.

In a Second Way: MAC CE or DCI.

The network side determines that there is data transmission on the SCG side, or the network side decides to transmit data on the SCG side for reasons such as bearer allocation, and sends the MAC CE or DCI signaling carrying the indication information that the SCG of the UE enters the activated state. The UE controls the SCG to enter the activated state after receiving the MAC CE or DCI signaling carrying the indication information that the SCG of the UE enters the activated state.

Second Way.

The UE receives a PSCell synchronous reconfiguration message of the UE sent by the network-side device, and the PSCell is in the activated state before receiving the message.

Referring to the above Embodiment 1, in the second way: the description part in which the UE receives the PSCell synchronous reconfiguration message of the UE sent by the network-side device and the PSCell is in the dormant state before receiving the message has illustrated the case where the UE receives the PSCell synchronous reconfiguration message of the UE sent by the network-side device and the PSCell is in the activated state before receiving the message, which will not be repeated in the embodiment of the present application.

In some embodiments of the present application, when the UE determines that there is data transmission on the SCG and needs to control the SCG to enter the activated state, the UE controls the PSCell to enter the activated state, and monitors and parses the PDCCH, so that the UE recovers to the data scheduling state more quickly, thereby reducing the data transmission delay.

In some embodiments of the present application, when determining that there is no data transmission on the SCG, the UE controls the PSCell to enter the dormant state, avoiding the waste of power consumption without a need to release the SCG, so that there is no need to reconfigure the SCG when initiating the data transmission again on the SCG side, and the data transmission is scheduled in the SCG in time according to the CSI measurement result reported in the dormant state, reducing the data transmission delay and providing a solution to quickly resume the data transmission while saving energy.

Embodiment 2

When the network-side device configures the SCG for the UE and the SCG is in the activated state, the network-side device MN or SN can decide the SCG of the UE to enter the dormant state, that is, send an instruction for the SCG of the UE to enter the dormant state to the UE.

For the convenience of description, three types of bearers that SCG may involve are denoted as DRB1, DRB2 and DRB3:
  DRB1: bearer of PDCP at the MN and RLC bearer at the SN (including split bearer and non-split bearer);
  DRB2: bearer of PDCP at the SN and also RLC bearer at the SN (including split bearer and non-split bearer);
  DRB3: bearer of PDCP at the SN and RLC bearer at the MN (not including split bearer).

First Way.

The MN decides that the SN enters the SCG dormant state.

Scenario 1: the UE is Only Configured with DRB1.

Optionally, the MN determines that the data transmission of the DRB1 ends (there is no data transmission), the MN decides to let the SCG of the UE enter the dormant state, the MN sends a signaling (first notification message) to notify the SN that the SCG of the UE enters the dormant state through the interconnection (X2/Xn) interface with the SN, and the SN may send a response message to notify the MN or let the SCG enter the dormant state after receiving the notification message from the MN. The first notification message is sent by the MN after determining that the data transmission of the UE ends to notify the SN that the SCG of the UE enters the dormant state.

Scenario 2: the UE is Configured with DRB2 and/or DRB3.

The SN determines that the data transmission of the DRB2 and/or DRB3 ends, sends a signaling (fourth notification message) through the X2/Xn interface to notify the MN that the SN-side data transmission of the UE ends, and requests the MN to set the SCG of the UE to be in the dormant state, wherein the end of data transmission may be the end of data transmission of DRB2 type or the end of data transmission of both DRB2 and DRB3 types. If the UE is not configured with DRB1 or is configured with DRB1 and the data transmission of the DRB1 ends, the MN notifies the SN that the SCG of the UE enters the dormant state (first notification message); if the DRB1 is configured and the data transmission of the DRB1 does not end, the MN will not notify the SN that the SCG of the UE enters the dormant state. The fourth notification message is sent by the SN after determining that the data transmission of the UE ends to notify the MN that the SCG of the UE can enter the dormant state.

In some embodiments of the present application, the SN or MN can determine whether there is data transmission on the UE through the PDCP or SDAP of the bearer configured with the UE, which will not be repeated.

Second Way.

The SN decides that the SN enters the SCG dormant state.

Scenario 1: the UE is Only Configured with DRB2 and/or DRB3.

Optionally, the SN determines that the data transmission of the DRB2 and/or DRB3 ends, wherein the end of data transmission may be the end of data transmission of DRB2 type or the end of data transmission of both DRB2 and DRB3 types. The SN decides to let the SCG of the UE enter the dormant state, the SN sends a signaling (third notification message) to notify the MN through the X2/Xn interface, the SN lets the SCG of the UE enter the dormant state, and the MN can send a response message to notify the SN, or the SCG enters the dormant state after receiving the notification message from the SN. The third notification message is sent by the SN after determining that the data transmission of the UE ends to notify the MN that the SCG of the UE enters the dormant state.

Scenario 2: the UE is Configured with DRB1.

The MN determines that the data transmission of the DRB1 ends and sends a signaling (second notification message) through the X2/Xn interface to notify the SN that the UE's data transmission at the SN and from the MN side ends. The SN is set to the dormant state by reference to the SCG of the UE. If the UE is not configured with DRB2 or DRB2 and DRB3 or is configured with DRB2 and/or DRB3 and the data transmission of the DRB2 and/or DRB3 ends, wherein the end of data transmission may be the end of data transmission of DRB2 type or the end of data transmission of both DRB2 and DRB3 types, the SN sets the SCG of the UE to the dormant state and informs the MN (third notification message); if the DRB2 and/or DRB3 is/are configured and the DRB2 and/or DRB3 has/have data transmission, wherein the data transmission may be data transmission of DRB2 type or data transmission of DRB2 or DRB3 type, the SN will not set the SCG of the UE to the dormant state. The second notification message is sent by the MN after determining that the data transmission of the UE ends to notify the SN that the SCG of the UE can enter the dormant state.

Here, whether the SCG enters the dormant state can be decided by only the MN as in the first way, or by only the SN as in the second way, or by both the MN and SN, for example: when the DRB2 and DRB3 do not exist, the MN can choose the first way to notify the SN to enter the SCG dormant state; when the DRB2 or DRB3 exists but the DRB1 does not exist, the SN can choose the second way to enter the SCG dormant state; when the DRB1 and DRB3 exist at the same time, the MN can notify the SN side as a reference for the SN to enter the dormant state after the DRB1 transmission ends, and the SN decides when to enter the dormant state; when the DRB2 firstly ends the transmission, the SN can notify the MN as a reference for the SN to enter the dormant state, and the MN decides when to enter the dormant state.

After the network-side device MN or SN decides to let the SCG of the UE enter the dormant state, it sends an instruction for controlling the SCG of the UE to enter the dormant state to the UE.

In addition, before the network-side device MN or SN sends an instruction for the SCG of the UE to enter the dormant state to the UE or configures a timer for the UE, the UE reports a message supporting the SCG dormant state or supporting the PSCell dormant state to the network-side device.

Optionally, the UE needs to report the abilities related to the SCG dormant state or PSCell dormant state to the network-side device, wherein the abilities include:
the ability to support the SCG dormant state, or the ability to support the PSCell dormant state; and/or the ability to directly set the SCG to enter the dormant state, or the ability to support the PSCell to enter the dormant state; and/or the ability to support a timer to switch the SCG from the activated state to the dormant state, or the ability to support a timer to switch the PSCell from the activated state to the dormant state; and/or the ability to perform the SCG state transition in signaling mode, or the ability to perform the PSCell state transition in signaling mode.

Embodiment 3

When the network-side device configures the SCG for the UE and the SCG is in the dormant state, the network-side device MN or SN can decide the SCG of the UE to enter the activated state, that is, send an instruction for the SCG of the UE to enter the activated state to the UE.

For the convenience of description, three types of bearers that SCG may involve are denoted as DRB1, DRB2 and DRB3:
DRB1: bearer of PDCP at the MN and RLC bearer at the SN (including split bearer and non-split bearer);
DRB2: bearer of PDCP at the SN and also RLC bearer at the SN (including split bearer and non-split bearer);
DRB3: bearer of PDCP at the SN and RLC bearer at the MN (not including split bearer).
First Way.
The MN decides that the SN enters the SCG activated state.
Scenario 1: the UE is Only Configured with DRB1.
Optionally, the MN determines that the DRB1 has data transmission, the MN decides to switch the SCG of the UE from the dormant state to the activated state, and the MN sends a signaling (fifth notification message) through the X2/Xn interface to notify the SN that the SCG of the UE enters the activated state. The SN may send a response message to notify the MN or directly set the SCG of the UE to the activated state after receiving the notification message from the MN. The fifth notification message is sent by the MN after determining that the UE resumes data transmission to notify the SN that the SCG of the UE enters the activated state.
Scenario 2: the UE is Configured with DRB2.
The SN determines that the DRB2 has data transmission, sends a signaling (eighth notification message) through the X2/Xn interface to notify the MN that the SN side of the UE has the data to be transmitted, and requests the MN to set the SCG of the UE to the activated state. If the MN decides to let the SCG of the UE enter the activated state, the MN notifies the SN to control the SCG of the UE to enter the activated state (fifth notification message); otherwise, the MN rejects the SN. The eighth notification message is sent by the SN after determining that the UE resumes data transmission to notify the MN that the SCG of the UE can enter or maintain the activated state.
Second Way.
The SN decides that the SN enters the SCG activated state.
Scenario 1: the UE is Only Configured with DRB2.
Optionally, the SN determines that the DRB2 has data transmission, the SN decides to let the SCG of the UE enter the activated state, and the SN sends a signaling (seventh notification message) through the X2/Xn interface to notify the MN that the SN lets the SCG of the UE enter the activated state. The MN may send a response message to notify the SN or directly set the SCG of the UE to the activated state after receiving the notification message from the SN. The seventh notification message is sent by the SN after determining that the UE resumes data transmission to notify the MN that the SCG of the UE enters the activated state.
Scenario 2: the UE is Configured with DRB1.
The MN determines that the DRB1 has data transmission, sends a signaling (sixth notification message) through the X2/Xn interface to notify the SN that the MN side of the UE has data to be transmitted on the SN side, and requests the SN to set the SCG of the UE to the activated state. If the UE decides to set the SCG of the UE to the activated state, it notifies the MN that the SCG of the UE enters the activated state (seventh notification message); otherwise, the SN rejects the MN. The sixth notification message is sent by the MN after determining that the UE resumes data transmission to notify the SN that the SCG of the UE can enter or maintain the activated state.

Here, whether the SCG enters the activated state can be decided by only the MN as in the first way, or by only the SN as in the second way, or by both the MN and SN, for example: when the DRB2 and/or DRB3 do/does not exist, the MN can choose the first way to notify the SN to enter the SCG activated state; when the DRB2 exists but the DRB1 does not exist, the SN can choose the second way to enter the SCG activated state; when the DRB1 and DRB2 exist at the same and when the DRB1 has data transmission, the MN can notify the SN to enter the SCG activated state; when the DRB2 firstly has data to be transmitted, the SN can notify the MN that the SN will enter the SCG activated state.

Embodiment 4

Based on the same inventive concept, an embodiment of the present application further provides an SCG state control method suitable for the MN, and the principle of this method to solve the problem is similar to the SCG state control method suitable for the UE, so the implementations of this method can refer to the above embodiments, and the repeated description thereof will be omitted.

Figure 3:
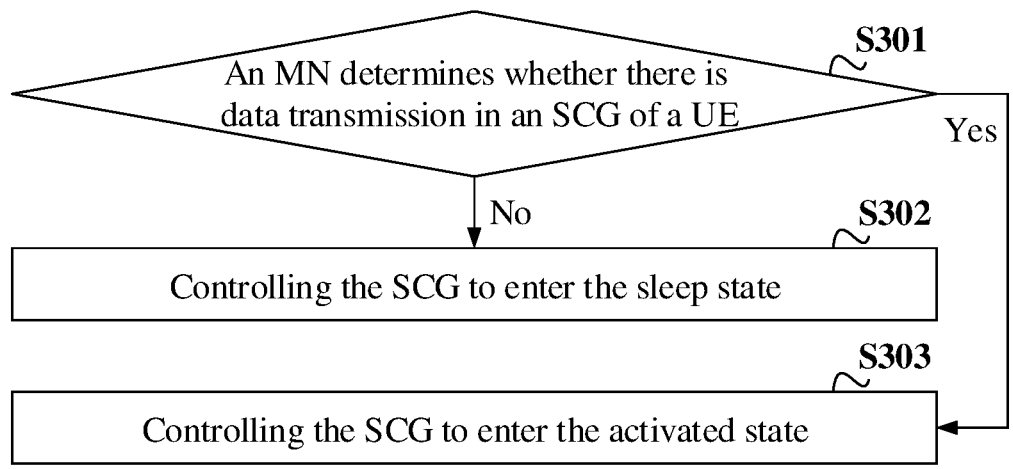
FIG. 3 is a second schematic diagram of an SCG state control process provided by an embodiment of the present application.

As shown in FIG. 3, the SCG state control method provided by the embodiment of the present application includes:

S301: an MN determines whether there is data transmission on an SCG of a UE, if not, proceed to S302; if so, proceed to S303;

S302: controlling the SCG to enter the dormant state;

S303: controlling the SCG to enter the activated state.

Optionally, the controlling the SCG to enter the dormant state, includes:

the MN sends an instruction for the SCG of the UE to enter the dormant state to the UE, or configures a timer for the UE, so that the UE controls a PSCell to enter the dormant state when receiving the instruction or determining that there is no data transmission on the SCG of the UE within a timing duration of the timer.

Optionally, the step in which the MN sends an instruction for the SCG of the UE to enter the dormant state to the UE includes:

the MN generates and sends an RRC signaling for the SCG of the UE to enter the dormant state to the UE; or the MN sends an RRC signaling for the SCG of the UE to enter the dormant state generated by an SN to the UE; or the MN generates and sends an MAC CE/DCI signaling for the SCG of the UE to enter the dormant state to the UE.

Optionally, the step in which the MN controls the SCG to enter the dormant state when determining that there is no data transmission on the SCG of the UE includes:

the MN determines that the data transmission of the UE ends, and sends a first notification message to control the SCG of the UE to enter the dormant state to the SN, wherein the first notification message is sent by the MN after determining that the data transmission of the UE ends and notifies the SN that the SCG of the UE enters the dormant state; or the MN determines that the data transmission of the UE ends, and sends a second notification message to control the SCG of the UE to enter the dormant state to the SN, wherein the second notification message is sent by the MN after determining that the data transmission of the UE ends and notifies the SN that the SCG of the UE can enter the dormant state; or the MN receives a third notification message that the SCG of the UE enters the dormant state sent by the SN, wherein the third notification message is sent by the SN after determining that the data transmission of the UE ends and notifies the MN that the SCG of the UE enters the dormant state; or the MN receives a fourth notification message that the SCG of the UE enters the dormant state sent by the SN, wherein the fourth notification message is sent by the SN after determining that the data transmission of the UE ends and notifies the MN that the SCG of the UE can enter the dormant state.

Optionally, before controlling the SCG to enter the dormant state, the method further includes:

receiving a message supporting the SCG dormant state or supporting the PSCell dormant state reported by the UE.

Optionally, after controlling the SCG to enter the dormant state, the method further includes:

receiving a CSI measurement result of the PSCell reported by the UE; and/or receiving a BSR of the SN side reported by the UE; and/or receiving a CSI measurement result of an SCell in the dormant state in the SCG reported by the UE.

Optionally, the controlling the SCG to enter an activated state, includes:

the MN sends an instruction for the SCG of the UE to enter the activated state to the UE, so that the UE controls the PSCell to enter the activated state.

Optionally, the step in which the MN sends an instruction for the SCG of the UE to enter the activated state to the UE includes:

the MN generates and sends an RRC signaling for the SCG of the UE to enter the activated state to the UE; or the MN sends an RRC signaling for the SCG of the UE to enter the activated state generated by an SN to the UE; or the MN generates and sends an MAC CE/DCI signaling for the SCG of the UE to enter the activated state to the UE.

Optionally, the step in which the MN controls the SCG to enter the activated state when determining that there is data transmission on the SCG of the UE includes:

the MN determines that the UE resumes data transmission, and sends a fifth notification message to control the SCG of the UE to enter the activated state to the SN, wherein the fifth notification message is sent by the MN after determining that the UE resumes data transmission and notifies the SN that the SCG of the UE enters the activated state; or the MN determines that the UE resumes data transmission, and sends a sixth notification message to control the SCG of the UE to enter the activated state to the SN, wherein the sixth notification message is sent by the MN after determining that the UE resumes data transmission and notifies the SN that the SCG of the UE can enter the activated state; or the MN receives a seventh notification message that the SCG of the UE enters the activated state sent by the SN, wherein the seventh notification message is sent by the SN after determining that the UE resumes data transmission and notifies the MN that the SCG of the UE enters the activated state; or the MN receives an eighth notification message that the SCG of the UE enters the activated state sent by the SN, wherein the eighth notification message is sent by the SN after determining that the UE resumes data transmission and notifies the MN that the SCG of the UE can enter or keep the activated state.

Embodiment 5

Based on the same inventive concept, an embodiment of the present application further provides an SCG state control method suitable for the SN, and the principle of this method to solve the problem is similar to the SCG state control method suitable for the UE, so the implementations of this method can refer to the above embodiments, and the repeated description thereof will be omitted.

Figure 4:
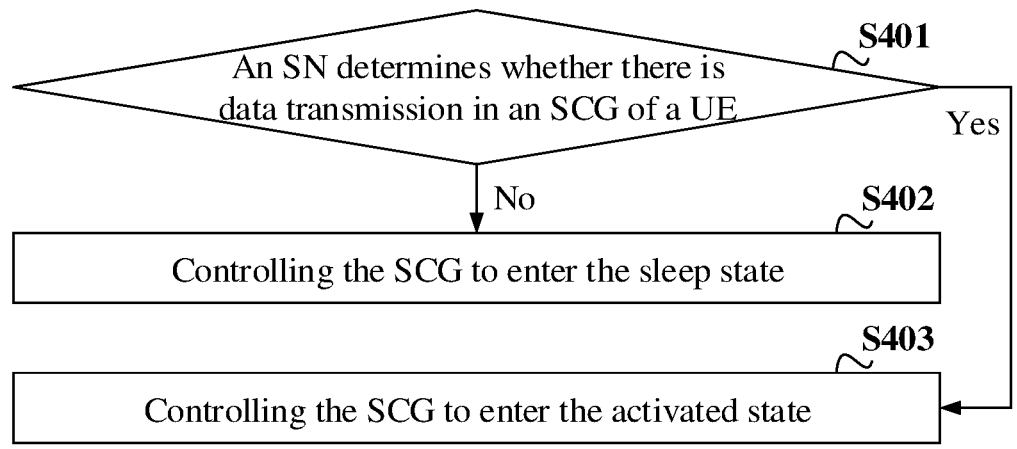
FIG. 4 is a third schematic diagram of an SCG state control process provided by an embodiment of the present application.

As shown in FIG. 4, the SCG state control method provided by the embodiment of the present application includes:

S401: an SN determines whether there is data transmission on an SCG of a UE, if not, proceed to S402; if so, proceed to S403;

S402: controlling the SCG to enter the dormant state;

S403: controlling the SCG to enter the activated state.

Optionally, the controlling the SCG to enter the dormant state, includes:
the SN sends an instruction for the SCG of the UE to enter the dormant state to the UE, or configures a timer for the UE, so that the UE controls a PSCell to enter the dormant state when receiving the instruction or determining that there is no data transmission on the SCG of the UE within a timing duration of the timer.

Optionally, the step in which the SN sends an instruction for the SCG of the UE to enter the dormant state to the UE includes:
the SN generates and sends an RRC signaling for the SCG of the UE to enter the dormant state to the UE; or
the SN generates and sends an MAC CE/DCI signaling for the SCG of the UE to enter the dormant state to the UE.

Optionally, the step in which the SN controls the SCG to enter the dormant state when determining that there is no data transmission on the SCG of the UE includes:
the SN determines that the data transmission of the UE ends, controls the SCG of the UE to enter the dormant state, and sends a third notification message that the SCG of the UE enters the dormant state to the MN, wherein the third notification message is sent by the SN after determining that the data transmission of the UE ends and notifies the MN that the SCG of the UE enters the dormant state; or
the SN determines that the data transmission of the UE ends, controls the SCG of the UE to enter the dormant state, and sends a fourth notification message that the SCG of the UE enters the dormant state to the MN, wherein the fourth notification message is sent by the SN after determining that the data transmission of the UE ends and notifies the MN that the SCG of the UE can enter the dormant state; or
the SN receives a first notification message that the SCG of the UE enters the dormant state sent by the MN, and controls the SCG of the UE to enter the dormant state, wherein the first notification message is sent by the MN after determining that the data transmission of the UE ends and notifies the SN that the SCG of the UE enters the dormant state; or
the SN receives a second notification message that the SCG of the UE enters the dormant state sent by the MN, and controls the SCG of the UE to enter the dormant state, wherein the second notification message is sent by the MN after determining that the data transmission of the UE ends and notifies the SN that the SCG of the UE can enter the dormant state.

Optionally, before controlling the SCG to enter the dormant state, the method further includes:
receiving a message supporting the SCG dormant state or supporting the PSCell dormant state reported by the UE.

Optionally, after controlling the SCG to enter the dormant state, the method further includes:
receiving a CSI measurement result of the PSCell and/or an SCell in the dormant state in the SCG reported by the UE through the PSCell; and/or
receiving a BSR of the SN side reported by the UE through the PSCell; and/or
receiving a CSI measurement result of the PSCell reported by the UE through an SCell in the activated state in the SCG; and/or
receiving a BSR of the SN side reported by the UE through an SCell in the activated state in the SCG.

Optionally, the controlling the SCG to enter an activated state, includes:
the SN sends an instruction for the SCG of the UE to enter the activated state to the UE, so that the UE controls the PSCell to enter the activated state.

Optionally, the step in which the SN sends an instruction for the SCG of the UE to enter the activated state to the UE includes:
the SN generates and sends an RRC signaling for the SCG of the UE to enter the activated state to the UE through the MN; or
the SN generates and sends an MAC CE/DCI signaling for the SCG of the UE to enter the activated state to the UE through an SCell in the activated state in the SCG.

Optionally, the step in which the SN controls the SCG to enter the activated state when determining that there is data transmission on the SCG of the UE includes:
the SN determines that the UE resumes data transmission, controls the SCG of the UE to enter the activated state, and sends a seventh notification message that the SCG of the UE enters the activated state to the MN, wherein the seventh notification message is sent by the SN after determining that the UE resumes data transmission and notifies the MN that the SCG of the UE enters the activated state; or
the SN determines that the UE resumes data transmission, controls the SCG of the UE to enter the activated state, and sends an eighth notification message that the SCG of the UE enters the activated state to the MN, wherein the eighth notification message is sent by the SN after determining that the UE resumes data transmission and notifies the MN that the SCG of the UE can enter or keep the activated state; or
the SN receives a fifth notification message that the SCG of the UE enters the activated state sent by the MN, and controls the SCG of the UE to enter the activated state, wherein the fifth notification message is sent by the MN after determining that the UE resumes data transmission and notifies the SN that the SCG of the UE enters the activated state; or
the SN receives a sixth notification message that the SCG of the UE enters the activated state sent by the MN, and controls the SCG of the UE to enter the activated state, wherein the sixth notification message is sent by the MN after determining that the UE resumes data transmission and notifies the SN that the SCG of the UE can enter or keep the activated state.

Embodiment 6

Figure 5:
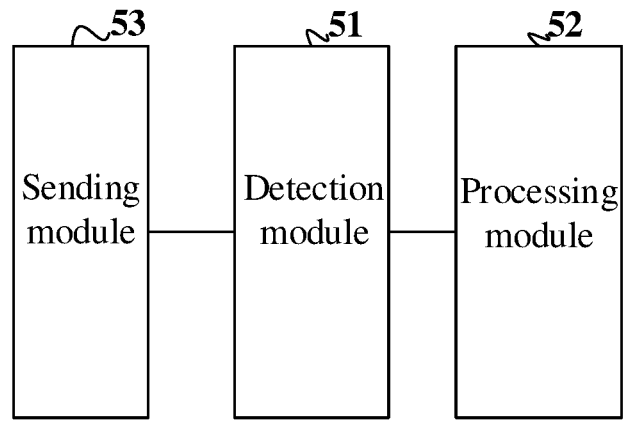
FIG. 5 is a first schematic diagram of an SCG state control apparatus provided by an embodiment of the present application.

FIG. 5 is an SCG state control apparatus provided by an embodiment of the present application, which is applied to a UE and includes:
a detection module 51 configured to determine whether there is data transmission on an SCG;
a processing module 52 configured to control a PSCell to enter a dormant state when a detection result of the detection module is no;
the processing module 52 is further configured to control the PSCell to enter an activated state when the detection result of the detection module is yes.

Optionally, the detection module 51 is specifically configured to determine that there is no data transmission on the SCG by: receiving an instruction for the SCG of the UE to enter the dormant state sent by a network-side device; and/or receiving a PSCell synchronous reconfiguration message of the UE sent by the network-side device, wherein the PSCell is in the dormant state before receiving the message; and/or determining that there is no data transmission on the SCG of the UE within a timing duration of a timer according to the timer configured by the network-side device for the UE.

Optionally, the processing module 52 is further configured to: control each SCell in the SCG to enter a default state; or control each SCell in the activated state in the SCG to enter the default state; or control each SCell in the activated state in the SCG to enter the dormant state, and each SCell in the dormant state to enter a deactivated state; wherein the default state is the dormant state or the deactivated state or a state maintained before receiving an instruction for the SCG to enter the dormant state.

Optionally, the processing module 52 is further configured to: if the instruction carries a target state of a target SCell in the SCG and the target state is the dormant state or deactivated state, control each target SCell in the SCG to enter the target state indicated by the instruction, and control each non-target SCell in the SCG to enter the default state or control each non-target SCell in the activated state in the SCG to enter the default state or control each non-target SCell in the activated state in the SCG to enter the dormant state and each non-target SCell in the dormant state to enter the deactivated state; wherein the default state is the dormant state or the deactivated state or a state maintained before receiving an instruction for the SCG to enter the dormant state.

Optionally, the timer determines that there is no data transmission on the SCG of the UE within a timing duration of the timer, including: the timer determines that the UE has no downlink data transmission on the PSCell within the timing duration of the timer; or the timer determines that the UE has no uplink data and downlink data transmission on the PSCell within the timing duration of the timer; or the timer determines that the UE has no downlink data transmission on the SCG within the timing duration of the timer; or the timer determines that the UE has no uplink data and downlink data transmission on the SCG within the timing duration of the timer.

Optionally, the receiving an instruction for the SCG of the UE to enter the dormant state sent by a network-side device, includes: receiving an RRC signaling for the SCG of the UE to enter the dormant state generated and sent by an MN; or receiving an RRC signaling for the SCG of the UE to enter the dormant state generated by an SN and sent through the MN; or receiving an RRC signaling for the SCG of the UE to enter the dormant state generated by an SN and sent through the SN; or receiving an MAC CE/DCI signaling for the SCG of the UE to enter the dormant state generated and sent by the MN; or receiving an MAC CE/DCI signaling for the SCG of the UE to enter the dormant state generated and sent by the SN.

Optionally, the apparatus further includes:
a sending module 53 configured to report a message supporting the SCG dormant state or supporting the PSCell dormant state to the network-side device.

Optionally, the sending module 53 is further configured to: report a CSI measurement result of the PSCell and/or an SCell in the dormant state in the SCG through an MCG; and/or report a CSI measurement result of the PSCell through an SCell in the activated state in the SCG; and/or report a CSI measurement result of the PSCell and/or an SCell in the dormant state in the SCG through the PSCell when a PUCCH and/or PUSCH of the PSCell of the UE is/are in the activated state; and/or report a BSR of the SN side through the MCG; and/or report a BSR of the SN side through an SCell in the activated state in the SCG; and/or report a BSR of the SN side through the PSCell when a PUCCH and/or PUSCH of the PSCell of the UE is/are in the activated state; and/or not monitor a PDCCH of the PSCell; and/or not monitor PDCCHs of all cells in the SCG.

Optionally, the detection module 51 is specifically configured to determine that there is data transmission on the SCG by: receiving an instruction for the SCG of the UE to enter the activated state sent by a network-side device; and/or receiving a PSCell synchronous reconfiguration message of the UE sent by the network-side device, wherein the PSCell is in the activated state before receiving the message.

Optionally, the receiving an instruction for the SCG of the UE to enter the activated state sent by a network-side device, includes: receiving an RRC signaling for the SCG of the UE to enter the activated state generated and sent by an MN; or receiving an RRC signaling for the SCG of the UE to enter the activated state generated by an SN and sent through the MN; or receiving an MAC CE/DCI signaling for the SCG of the UE to enter the activated state generated and sent by the MN; or receiving an MAC CE/DCI signaling for the SCG of the UE to enter the activated state generated by an SN and sent through an SCell in the activated state of the SCG.

Embodiment 7

Figure 6:
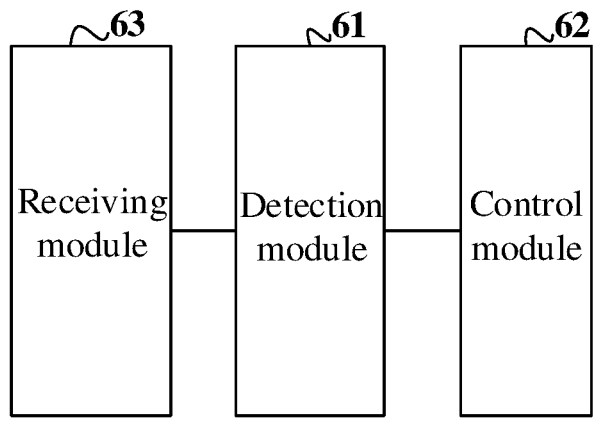
FIG. 6 is a second schematic diagram of an SCG state control apparatus provided by an embodiment of the present application.

FIG. 6 is an SCG state control apparatus provided by an embodiment of the present application, which is applied to an MN and includes:
a detection module 61 configured to determine whether there is data transmission on an SCG of a UE;
a control module 62 configured to control the SCG to enter a dormant state when a detection result of the detection module is no;
the control module 62 is further configured to control the SCG to enter an activated state when the detection result of the detection module is yes.

Optionally, the control module 62 is specifically configured to: send an instruction for the SCG of the UE to enter the dormant state to the UE, or configure a timer for the UE, so that the UE controls a PSCell to enter the dormant state when receiving the instruction or determining that there is no data transmission on the SCG of the UE within a timing duration of the timer.

Optionally, the control module 62 is specifically configured to: generate and send an RRC signaling for the SCG of the UE to enter the dormant state to the UE; or send an RRC signaling for the SCG of the UE to enter the dormant state generated by an SN to the UE; or generate and send an MAC CE/DCI signaling for the SCG of the UE to enter the dormant state to the UE.

Optionally, the control module 62 is specifically configured to: determine that the data transmission of the UE ends, and send a first notification message to control the SCG of the UE to enter the dormant state to the SN, wherein the first notification message is sent by the MN after determining that the data transmission of the UE ends and notifies the SN that the SCG of the UE enters the dormant state; or determine that the data transmission of the UE ends, and send a second notification message to control the SCG of the UE to enter the dormant state to the SN, wherein the second notification message is sent by the MN after determining that the data transmission of the UE ends and notifies the SN that the SCG of the UE can enter the dormant state; or receive a third notification message that the SCG of the UE enters the dormant state sent by the SN, wherein the third notification message is sent by the SN after determining that the data transmission of the UE ends and notifies the MN that the SCG of the UE enters the dormant state; or receive a fourth notification message that the SCG of the UE enters the dormant state sent by the SN, wherein the fourth notification message is sent by the SN after determining that the data transmission of the UE ends and notifies the MN that the SCG of the UE can enter the dormant state.

Optionally, the apparatus further includes:
a receiving module 63 configured to receive a message supporting the SCG dormant state or supporting the PSCell dormant state reported by the UE.

Optionally, the receiving module 63 is further configured to: receive a CSI measurement result of the PSCell reported by the UE; and/or receive a BSR of the SN side reported by the UE; and/or receive a CSI measurement result of an SCell in the dormant state in the SCG reported by the UE.

Optionally, the control module 62 is specifically configured to send an instruction for the SCG of the UE to enter the activated state to the UE, so that the UE controls the PSCell to enter the activated state.

Optionally, the control module 62 is specifically configured to: generate and send an RRC signaling for the SCG of the UE to enter the activated state to the UE; or send an RRC signaling for the SCG of the UE to enter the activated state generated by an SN to the UE; or generate and send an MAC CE/DCI signaling for the SCG of the UE to enter the activated state to the UE.

Optionally, the control module 62 is specifically configured to: determine that the UE resumes data transmission, and send a fifth notification message to control the SCG of the UE to enter the activated state to the SN, wherein the fifth notification message is sent by the MN after determining that the UE resumes data transmission and notifies the SN that the SCG of the UE enters the activated state; or determine that the UE resumes data transmission, and send a sixth notification message to control the SCG of the UE to enter the activated state to the SN, wherein the sixth notification message is sent by the MN after determining that the UE resumes data transmission and notifies the SN that the SCG of the UE can enter the activated state; or receive a seventh notification message that the SCG of the UE enters the activated state sent by the SN, wherein the seventh notification message is sent by the SN after determining that the UE resumes data transmission and notifies the MN that the SCG of the UE enters the activated state; or receive an eighth notification message that the SCG of the UE enters the activated state sent by the SN, wherein the eighth notification message is sent by the SN after determining that the UE resumes data transmission and notifies the MN that the SCG of the UE can enter or keep the activated state.

Embodiment 8

Figure 7:
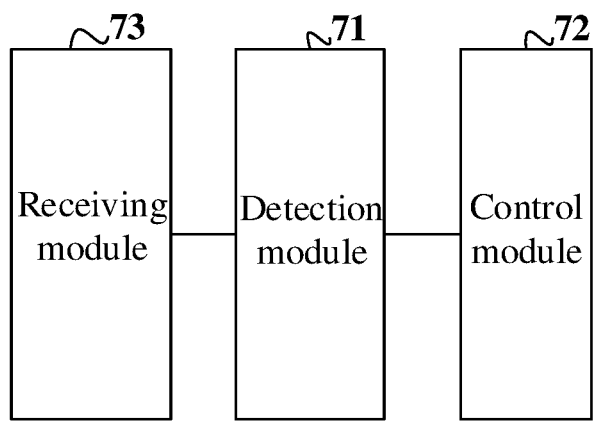
FIG. 7 is a third schematic diagram of an SCG state control apparatus provided by an embodiment of the present application.

FIG. 7 is an SCG state control apparatus provided by an embodiment of the present application, which is applied to an SN and includes:
a detection module 71 configured to detect whether there is data transmission on an SCG of a UE;
a control module 72 configured to control the SCG to enter a dormant state when a detection result of the detection module is no;
the control module 72 is further configured to control the SCG to enter an activated state when the detection result of the detection module is yes.

Optionally, the control module 72 is specifically configured to: send an instruction for the SCG of the UE to enter the dormant state to the UE, or configure a timer for the UE, so that the UE controls a PSCell to enter the dormant state when receiving the instruction or determining that there is no data transmission on the SCG of the UE within a timing duration of the timer.

Optionally, the control module 72 is specifically configured to: generate and send an RRC signaling for the SCG of the UE to enter the dormant state to the UE; or generate and send an MAC CE/DCI signaling for the SCG of the UE to enter the dormant state to the UE.

Optionally, the control module 72 is specifically configured to: determine that the data transmission of the UE ends, control the SCG of the UE to enter the dormant state, and send a third notification message that the SCG of the UE enters the dormant state to the MN, wherein the third notification message is sent by the SN after determining that the data transmission of the UE ends and notifies the MN that the SCG of the UE enters the dormant state; or determine that the data transmission of the UE ends, control the SCG of the UE to enter the dormant state, and send a fourth notification message that the SCG of the UE enters the dormant state to the MN, wherein the fourth notification message is sent by the SN after determining that the data transmission of the UE ends and notifies the MN that the SCG of the UE can enter the dormant state; or receive a first notification message that the SCG of the UE enters the dormant state sent by the MN, and control the SCG of the UE to enter the dormant state, wherein the first notification message is sent by the MN after determining that the data transmission of the UE ends and notifies the SN that the SCG of the UE enters the dormant state; or receive a second notification message that the SCG of the UE enters the dormant state sent by the MN, and control the SCG of the UE to enter the dormant state, wherein the second notification message is sent by the MN after determining that the data transmission of the UE ends and notifies the SN that the SCG of the UE can enter the dormant state.

Optionally, the apparatus further includes:
a receiving module 73 configured to receive a message supporting the SCG dormant state or supporting the PSCell dormant state reported by the UE.

Optionally, the receiving module 73 is further configured to: receive a CSI measurement result of the PSCell and/or an SCell in the dormant state in the SCG reported by the UE through the PSCell; and/or receive a BSR of the SN side reported by the UE through the PSCell; and/or receive a CSI measurement result of the PSCell reported by the UE through an SCell in the activated state in the SCG; and/or receive a BSR of the SN side reported by the UE through an SCell in the activated state in the SCG.

Optionally, the control module 72 is configured to send an instruction for the SCG of the UE to enter the activated state to the UE, so that the UE controls the PSCell to enter the activated state.

Optionally, the control module 72 is configured to: generate and send an RRC signaling for the SCG of the UE to enter the activated state to the UE through the MN; or generate and send an MAC CE/DCI signaling for the SCG of the UE to enter the activated state to the UE through an SCell in the activated state in the SCG.

Optionally, the control module 72 is configured to: determine that the UE resumes data transmission, control the SCG of the UE to enter the activated state, and send a seventh notification message that the SCG of the UE enters the activated state to the MN, wherein the seventh notification message is sent by the SN after determining that the UE resumes data transmission and notifies the MN that the SCG of the UE enters the activated state; or determine that the UE resumes data transmission, control the SCG of the UE to enter the activated state, and send an eighth notification message that the SCG of the UE enters the activated state to the MN, wherein the eighth notification message is sent by the SN after determining that the UE resumes data transmission and notifies the MN that the SCG of the UE can enter or keep the activated state; or receive a fifth notification message that the SCG of the UE enters the activated state sent by the MN, and control the SCG of the UE to enter the activated state, wherein the fifth notification message is sent by the MN after determining that the UE resumes data transmission and notifies the SN that the SCG of the UE enters the activated state; or receive a sixth notification message that the SCG of the UE enters the activated state sent by the MN, and control the SCG of the UE to enter the activated state, wherein the sixth notification message is sent by the MN after determining that the UE resumes data transmission and notifies the SN that the SCG of the UE can enter or keep the activated state.

Embodiment 9

Figure 8:
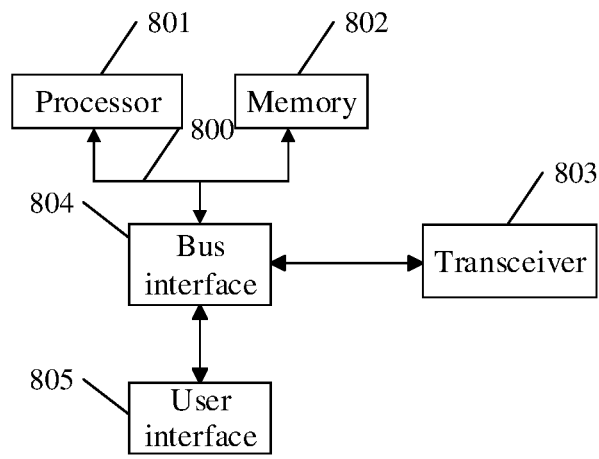
FIG. 8 is a structural schematic diagram of a UE provided by an embodiment of the present application.

Based on the same inventive concept, an embodiment of the present application further provides a UE. Since the principle of the UE to solve the problem is similar to the SCG state control method applicable to the UE, the implementations of the UE can refer to the implementations of the method, and the repeated description thereof will be omitted here. As shown in FIG. 8, the UE includes: a processor 801, a memory 802, and a transceiver 803.

The memory 802 is configured to store computer instructions.

The processor 801 is configured to run the computer instructions to implement the above-mentioned SCG state control method applicable to the UE.

The transceiver 803 is configured to receive and send data under the control of the processor.

In FIG. 8, the bus architecture is represented by the bus 800. The bus 800 can include any numbers of interconnected buses and bridges, and the bus 800 links various circuits including one or more processors represented by the processor 801 and the memory represented by the memory 802. The bus 800 can further link various other circuits such as peripheral device, voltage regulator and power management circuit, which are all well known in the art and thus will not be further described again herein. The bus interface 804 provides an interface between the bus 800 and the transceiver 803. The transceiver 803 can be one element or can be a plurality of elements, i.e., a plurality of receiver and transmitter, and provide the units for communicating with various other devices over the transmission media. For example, the transceiver 803 receives the external data from other devices. The transceiver 803 is configured to send the data processed by the processor 801 to other devices. Depending on the nature of the computing system, a user interface 805 may also be provided, such as a keypad, display, speaker, microphone, joystick.

The processor 801 is responsible for managing the bus 800 and general processing, for example, runs a general operating system as described above. The memory 802 can be used to store the data used by the processor 801 when performing the operations.

Optionally, the processor 801 may be Central Processing Unit (CPU), Application Specific Integrated Circuit (ASIC), Field-Programmable Gate Array (FPGA) or Complex Programmable Logic Device (CPLD).

Embodiment 10

Figure 9:
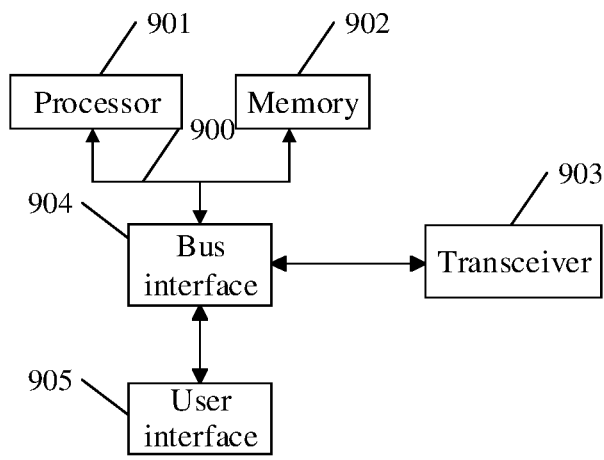
FIG. 9 is a structural schematic diagram of an MN provided by an embodiment of the present application.

Based on the same inventive concept, an embodiment of the present application further provides a MN. Since the principle of the MN to solve the problem is similar to the SCG state control method applicable to the MN, the implementations of the MN can refer to the implementations of the method, and the repeated description thereof will be omitted here. As shown in FIG. 9, the MN includes: a processor 901, a memory 902, and a transceiver 903.

The memory 902 is configured to store computer instructions.

The processor 901 is configured to run the computer instructions to implement the above-mentioned SCG state control method applicable to the MN.

The transceiver 903 is configured to receive and send data under the control of the processor.

In FIG. 9, the bus architecture is represented by the bus 900. The bus 900 can include any numbers of interconnected buses and bridges, and the bus 900 links various circuits including one or more processors represented by the processor 901 and the memory represented by the memory 902. The bus 900 can further link various other circuits such as peripheral device, voltage regulator and power management circuit, which are all well known in the art and thus will not be further described again herein. The bus interface 904 provides an interface between the bus 900 and the transceiver 903. The transceiver 903 can be one element or can be a plurality of elements, i.e., a plurality of receiver and transmitter, and provide the units for communicating with various other devices over the transmission media. For example, the transceiver 903 receives the external data from other devices. The transceiver 903 is configured to send the data processed by the processor 901 to other devices. Depending on the nature of the computing system, a user interface 905 may also be provided, such as a keypad, display, speaker, microphone, joystick.

The processor 901 is responsible for managing the bus 900 and general processing, for example, runs a general operating system as described above. The memory 902 can be used to store the data used by the processor 901 when performing the operations.

Optionally, the processor 901 may be Central Processing Unit (CPU), Application Specific Integrated Circuit (ASIC), Field-Programmable Gate Array (FPGA) or Complex Programmable Logic Device (CPLD).

Embodiment 11

Figure 10:
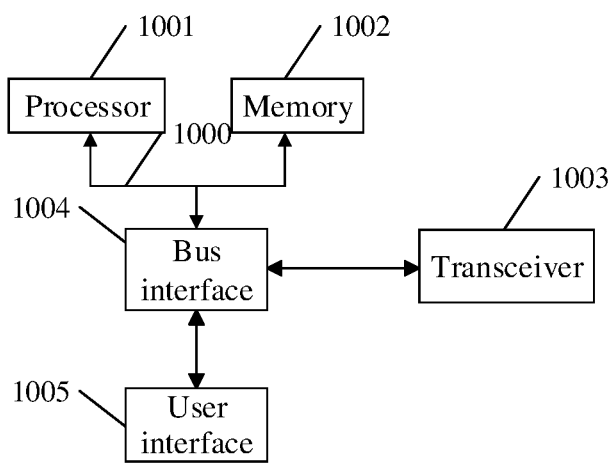
FIG. 10 is a structural schematic diagram of an SN provided by an embodiment of the present application.

Based on the same inventive concept, an embodiment of the present application further provides a SN. Since the principle of the SN to solve the problem is similar to the SCG state control method applicable to the SN, the implementations of the SN can refer to the implementations of the method, and the repeated description thereof will be omitted here. As shown in FIG. 10, the SN includes: a processor 1001, a memory 1002, and a transceiver 1003.

The memory 1002 is configured to store computer instructions.

The processor 1001 is configured to run the computer instructions to implement the above-mentioned SCG state control method applicable to the SN.

The transceiver 1003 is configured to receive and send data under the control of the processor.

In FIG. 10, the bus architecture is represented by the bus 1000. The bus 1000 can include any numbers of interconnected buses and bridges, and the bus 1000 links various circuits including one or more processors represented by the processor 1001 and the memory represented by the memory 1002. The bus 1000 can further link various other circuits such as peripheral device, voltage regulator and power management circuit, which are all well known in the art and thus will not be further described again herein. The bus interface 1004 provides an interface between the bus 1000 and the transceiver 1003. The transceiver 1003 can be one element or can be a plurality of elements, i.e., a plurality of receiver and transmitter, and provide the units for communicating with various other devices over the transmission media. For example, the transceiver 1003 receives the external data from other devices. The transceiver 1003 is configured to send the data processed by the processor 1001 to other devices. Depending on the nature of the computing system, a user interface 1005 may also be provided, such as a keypad, display, speaker, microphone, joystick.

The processor 1001 is responsible for managing the bus 1000 and general processing, for example, runs a general operating system as described above. The memory 1002 can be used to store the data used by the processor 1001 when performing the operations.

Optionally, the processor 1001 may be Central Processing Unit (CPU), Application Specific Integrated Circuit (ASIC), Field-Programmable Gate Array (FPGA) or Complex Programmable Logic Device (CPLD).

On the basis of the foregoing embodiments, an embodiment of the present application further provides a computer readable storage medium storing computer instructions, which implement the above-mentioned SCG state control method applicable to the UE when executed by a processor of the UE.

On the basis of the foregoing embodiments, an embodiment of the present application further provides a computer readable storage medium storing computer instructions, which implement the above-mentioned SCG state control method applicable to the MN when executed by a processor of the MN.

On the basis of the foregoing embodiments, an embodiment of the present application further provides a computer readable storage medium storing computer instructions, which implement the above-mentioned SCG state control method applicable to the SN when executed by a processor of the SN.

For the system/apparatus embodiments, they are substantially similar to the method embodiments, so the description thereof is relatively simple, and the related parts may refer to the partial illustration of the method embodiments.

It should be understood by those skilled in the art that the embodiments of the present application can provide methods, systems and computer program products. Thus the present application can take the form of hardware embodiments alone, software embodiments alone, or embodiments combining the software and hardware aspects. Also the present application can take the form of computer program products implemented on one or more computer usable storage mediums (including but not limited to magnetic disk memories, CD-ROMs, optical memories and the like) containing computer usable program codes therein.

The present application is described by reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Although the preferred embodiments of the present application have been described, those skilled in the art can make additional alterations and modifications to these embodiments once they learn about the basic creative concepts. Thus the attached claims are intended to be interpreted to include the preferred embodiments as well as all the alterations and modifications falling within the scope of the present application.

Evidently those skilled in the art can make various modifications and variations to the embodiments of the present application without departing from the spirit and scope of the embodiments of the present application. Thus the present application is also intended to encompass these modifications and variations therein as long as these modifications and variations to the embodiments of the present application come into the scope of the claims of the present application and their equivalents.

What is claimed is:

1. A Secondary Cell Group, SCG, state control method, comprises:

determining, by a User Equipment, UE, whether there is data transmission on an SCG;

controlling a Primary SCG Cell, PSCell, to enter a dormant state when determining that there is no data transmission on the SCG;

controlling the PSCell to enter an activated state when determining that there is data transmission on the SCG;

wherein the determining that there is no data transmission on the SCG, comprises:

receiving, by the UE, an instruction for the SCG of the UE to enter the dormant state sent by a network-side device; and receiving, by the UE, a PSCell synchronous reconfiguration message of the UE sent by the network-side device, wherein the PSCell is in the dormant state before receiving the message; and determining, by the UE, that there is no data transmission on the SCG of the UE within a timing duration of a timer according to the timer configured by the network-side device for the UE;

wherein the determining that there is data transmission on the SCG, comprises:

receiving, by the UE, an instruction for the SCG of the UE to enter the activated state sent by a network-side device; and receiving, by the UE, a PSCell synchronous reconfiguration message of the UE sent by the network-side device, wherein the PSCell is in the activated state before receiving the message.

2. The method of claim 1, wherein after controlling the PSCell to enter the dormant state, the method further comprises:
controlling each Secondary Cell, SCell, in the SCG to enter a default state; or
controlling each SCell in the activated state in the SCG to enter the default state; or
controlling each SCell in the activated state in the SCG to enter the dormant state, and each SCell in the dormant state to enter a deactivated state;
wherein the default state is the dormant state or the deactivated state or a state maintained before receiving an instruction for the SCG to enter the dormant state; or
after the PSCell enters the dormant state, the method further comprises:
reporting, by the UE, a Channel State Information, CSI, measurement result of the PSCell and/or an SCell in the dormant state in the SCG through a Master Cell Group, MCG; and/or
reporting, by the UE, a CSI measurement result of the PSCell through an SCell in the activated state in the SCG; and/or
reporting a CSI measurement result of the PSCell and/or an SCell in the dormant state in the SCG through the PSCell in response to a Physical Uplink Control Channel, PUCCH, and/or Physical Uplink Shared Channel, PUSCH, of the PSCell of the UE being in the activated state;
and/or reporting, by the UE, a Buffer Status Report, BSR, of the SN side through the MCG;
and/or reporting, by the UE, a BSR of the SN side through an SCell in the activated state in the SCG; and/or
reporting a BSR of the SN side through the PSCell in response to a PUCCH and/or PUSCH of the PSCell of the UE being in the activated state; and/or
not monitoring, by the UE, a Physical Downlink Control Channel, PDCCH, of the PSCell; and/or
not monitoring, by the UE, PDCCHs of all cells in the SCG.

3. The method of claim 1, wherein if the instruction carries a target state of a target SCell in the SCG and the target state is the dormant state or deactivated state, after controlling the PSCell to enter the dormant state, the method further comprises:
controlling each target SCell in the SCG to enter the target state indicated by the instruction, and controlling each non-target SCell in the SCG to enter the default state or controlling each non-target SCell in the activated state in the SCG to enter the default state or controlling each non-target SCell in the activated state in the SCG to enter the dormant state and each non-target SCell in the dormant state to enter the deactivated state;
wherein the default state is the dormant state or the deactivated state or a state maintained before receiving an instruction for the SCG to enter the dormant state.

4. The method of claim 1, wherein the determining, by the timer, that there is no data transmission on the SCG of the UE within a timing duration of the timer, comprises:

determining, by the timer, that the UE has no downlink data transmission on the PSCell within the timing duration of the timer; or
determining, by the timer, that the UE has no uplink data and downlink data transmission the PSCell within the timing duration of the timer; or
determining, by the timer, that the UE has no downlink data transmission on the SCG within the timing duration of the timer; or
determining, by the timer, that the UE has no uplink data and downlink data transmission on the SCG within the timing duration of the timer.

5. The method of claim 1, wherein the receiving, by the UE, an instruction for the SCG of the UE to enter the dormant state sent by a network-side device, comprises:
receiving, by the UE, a Radio Resource Control, RRC, signaling for the SCG of the UE to enter the dormant state generated and sent by a Master Node, MN; or
receiving, by the UE, an RRC signaling for the SCG of the UE to enter the dormant state generated by a Secondary Node, SN, and sent through the MN; or
receiving, by the UE, an RRC signaling for the SCG of the UE to enter the dormant state generated by an SN and sent through the SN; or
receiving, by the UE, a Medium Access Control Control Element, MAC CE/Downlink Control Information, DCI, signaling for the SCG of the UE to enter the dormant state generated and sent by the MN; or
receiving, by the UE, an MAC CE/DCI signaling for the SCG of the UE to enter the dormant state generated and sent by the SN.

6. The method of claim 1, wherein before determining whether there is data transmission on the SCG, the method further comprises:
reporting, by the UE, a message supporting the SCG dormant state or supporting the PSCell dormant state to the network-side device.

7. The method of claim 1,
wherein the receiving, by the UE, an instruction for the SCG of the UE to enter the activated state sent by a network-side device, comprises:
receiving, by the UE, an RRC signaling for the SCG of the UE to enter the activated state generated and sent by an MN; or
receiving, by the UE, an RRC signaling for the SCG of the UE to enter the activated state generated by an SN and sent through the MN; or
receiving, by the UE, an MAC CE/DCI signaling for the SCG of the UE to enter the activated state generated and sent by the MN; or
receiving, by the UE, an MAC CE/DCI signaling for the SCG of the UE to enter the activated state generated by an SN and sent through an SCell in the activated state of the SCG.

8. A User Equipment, UE, comprises: a processor, a memory and a transceiver;
the memory is configured to store computer instructions;
the processor is configured to execute the computer instructions to implement the method of claim 1.

* * * * *